United States Patent
Kristjansson et al.

(10) Patent No.: US 10,147,439 B1
(45) Date of Patent: Dec. 4, 2018

(54) VOLUME ADJUSTMENT FOR LISTENING ENVIRONMENT

(71) Applicant: Amazon Technologies, Inc., Seattle, WA (US)

(72) Inventors: Trausti Thor Kristjansson, San Jose, CA (US); Mohamed Mansour, Cupertino, CA (US); Amit Singh Chhetri, Santa Clara, CA (US); Ludger Solbach, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/474,197

(22) Filed: Mar. 30, 2017

(51) Int. Cl.
| | |
|---|---|
| *G06F 3/00* | (2006.01) |
| *G10L 21/0364* | (2013.01) |
| *G10L 15/22* | (2006.01) |
| *G10L 21/0232* | (2013.01) |
| *G10L 13/00* | (2006.01) |
| *G10L 21/0216* | (2013.01) |

(52) U.S. Cl.
CPC .......... *G10L 21/0364* (2013.01); *G10L 13/00* (2013.01); *G10L 15/22* (2013.01); *G10L 21/0232* (2013.01); *G10L 2015/223* (2013.01); *G10L 2021/02166* (2013.01)

(58) Field of Classification Search
CPC ......... G06F 3/165; G06F 3/167; G10L 15/22; G10L 15/265
USPC ............................................. 704/423
See application file for complete search history.

(56) References Cited

U.S. PATENT DOCUMENTS

| | | | | |
|---|---|---|---|---|
| 8,862,387 | B2 * | 10/2014 | Kandangath | G01C 21/3629 701/419 |
| 2014/0135076 | A1 * | 5/2014 | Lee | H04M 1/6041 455/569.1 |
| 2017/0242650 | A1 * | 8/2017 | Jarvis | H04S 7/301 |
| 2017/0242651 | A1 * | 8/2017 | Lang | G06F 3/165 |

* cited by examiner

Primary Examiner — Daniel Abebe
(74) Attorney, Agent, or Firm — Pierce Atwood LLP

(57) ABSTRACT

A speech-capturing device that can modulate its output audio data volume based on environmental sound conditions at the location of a user speaking to the device. The device detects the sound pressure of a spoken utterance at the device location and determines the distance of the user from the device. The device also detects the sound pressure of noise at the device and uses information about the location of the noise source and user to determine the sound pressure of noise at the location of the talker. The device can then adjust the gain for output audio (such as a spoken response to the utterance) to ensure that the output audio is at a certain desired sound pressure when it reaches the location of the user.

18 Claims, 13 Drawing Sheets

US 10,147,439 B1

VOLUME ADJUSTMENT FOR LISTENING ENVIRONMENT

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions. Output of speech processing systems may include synthesized speech.

BRIEF DESCRIPTION OF DRAWINGS

For a more complete understanding of the present disclosure, reference is now made to the following description taken in conjunction with the accompanying drawings.

DETAILED DESCRIPTION

Automatic speech recognition (ASR) is a field of computer science, artificial intelligence, and linguistics concerned with transforming audio data associated with speech into text data representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

A speech processing system may be configured as a relatively self-contained system where one device captures audio, performs speech processing, and executes a command corresponding to the input speech. Alternatively, a speech processing system may be configured as a distributed system where a number of different devices combine to capture audio of a spoken utterance, perform speech processing, and execute a command corresponding to the utterance. In a distributed system, one device may capture audio while other device(s) perform speech processing, etc. Output audio data resulting from execution of the command, for example synthesized speech responding to the input utterance, may then be sent back to the same device that captured the original utterance, or may be sent to one or more other devices.

Listening environments for users may vary in terms of the amount of noise experienced by the user. Various noise sources may combine to make it difficult for a user to hear and/or understand output audio from a device. To improve the ability of a user to detect and understand output audio from a device, a system may determine a location of a user and noise sources relative to a device, may determine the noise level at the user's location, and may determine a gain for output audio data to ensure the output audio is at a sufficient volume when it reaches the user's location. The system may also incorporate user feedback regarding the output volume for purposes of determining the output volume at a future time under similar noise conditions. While the present techniques are illustrated for a speech processing system, they are applicable to other systems as well including a voice over internet protocol (VoIP) system, different communication systems, or other such systems that involve the exchange of audio data.

Figure 1:
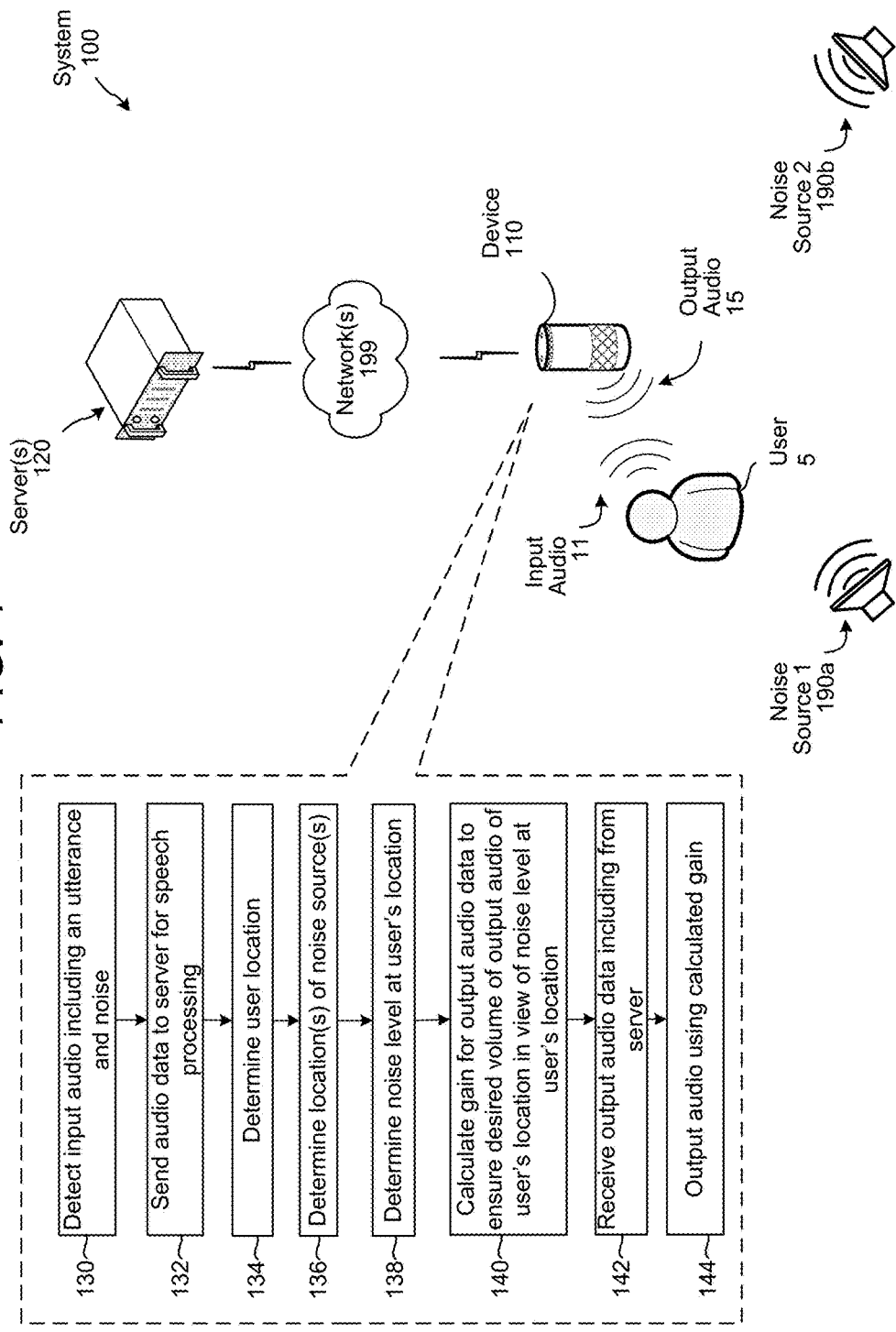
FIG. 1 illustrates a speech processing system configured to adjust output volume according to embodiments of the present disclosure.

FIG. 1 shows a speech processing system 100. Although the figures and discussion illustrate certain operational steps of the system 100 in a particular order, the steps described may be performed in a different order (as well as certain steps removed or added) without departing from the intent of the disclosure. As shown in FIG. 1, the system 100 may include one or more speech-controlled devices 110 local to user 5, as well as one or more networks 199 and one or more servers 120 connected to speech-controlled device(s) 110 across network(s) 199. The server(s) 120 (which may be one or more different physical devices) may be capable of performing traditional speech processing (e.g., ASR, NLU, command processing, etc.) or other operations as described herein. A single server 120 may perform all speech processing or multiple servers 120 may combine to perform all speech processing. Further, the server(s) 120 may execute certain commands, such as answering spoken utterances of the users 5, operating other devices (light switches, appliances, etc.). In addition, certain speech detection or command execution functions may be performed by the speech-controlled device 110. Further, the system may be in communication with external data sources, such as a knowledge base, external service provider devices, or the like.

In one example, as shown in FIG. 1, a user 5 may be in an environment with device 110 as well as noise sources 190a and 190b. The user 5 may speak an utterance which is represented in input audio 11. The device 110 may detect (130) the input audio which may include both the utterance as well as noise from the noise sources. The device 110 may send (132) audio data to the server 120 for speech processing. The device 110 may determine (134) the user's location relative to the device 110, either through range finding, image processing, estimation or other techniques. The device 110 may also determine (136) the location(s) of noise sources in the environment also through range finding, image processing, estimation or other techniques. Using the location information as well as sound pressure information of the noise as detected in the input audio, the device may determine (138) the noise level at the user's location. The device may then calculate (140) a gain for output audio data to ensure a desired volume of the output audio when it reaches the user's location. The desired volume may be an absolute volume and/or a volume relative to the noise at the user's location. The device 110 may receive (142) output audio data from the server corresponding to the utterance and may output (144) audio corresponding to the output audio data using the calculated gain to determine the initial output audio volume at the device. The gain should ensure that the output audio is at a sufficient volume by the time it reaches the user 5.

Figure 2:
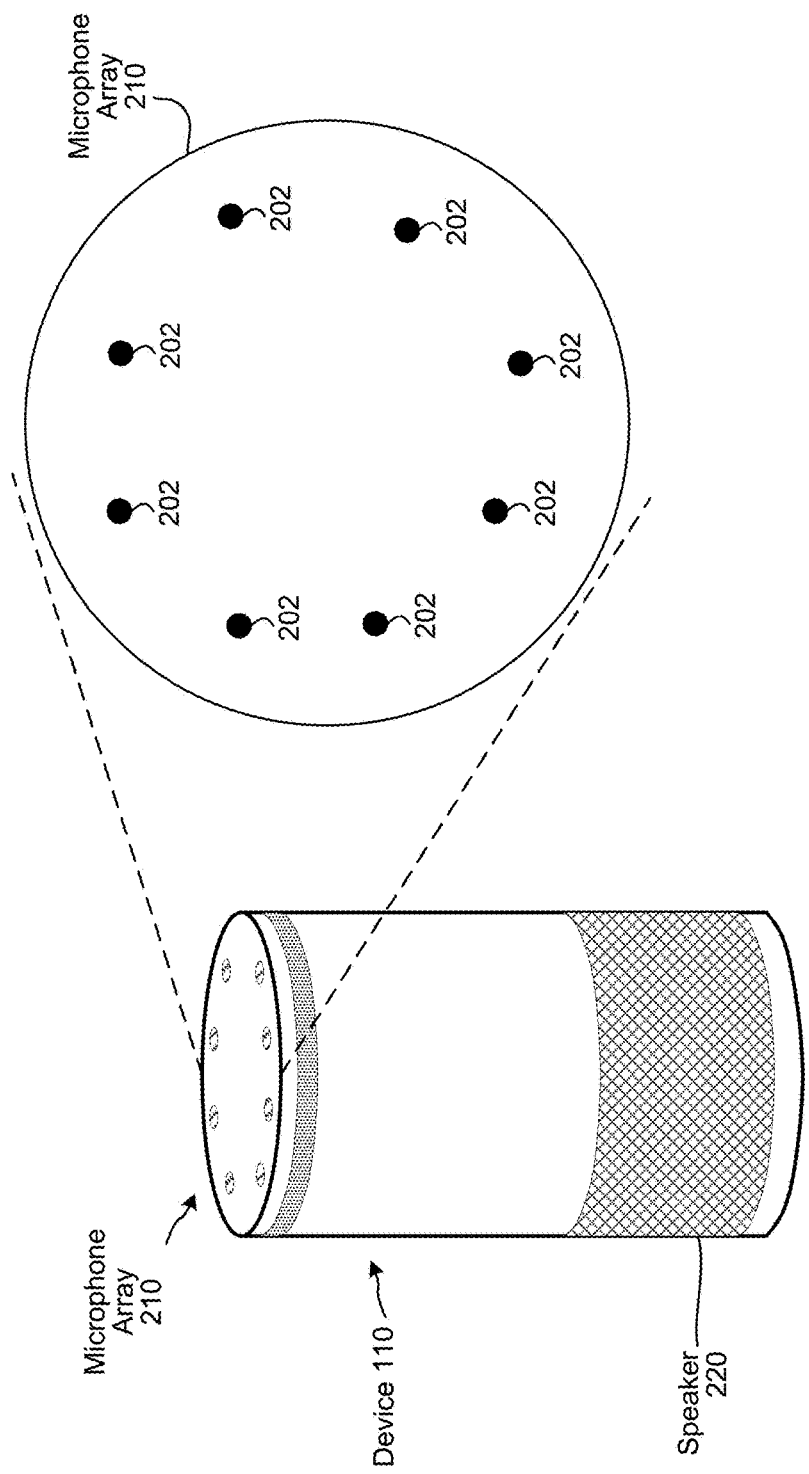
FIG. 2 illustrates certain components of a device configured to input and output audio according to embodiments of the present disclosure.
Figure 11:
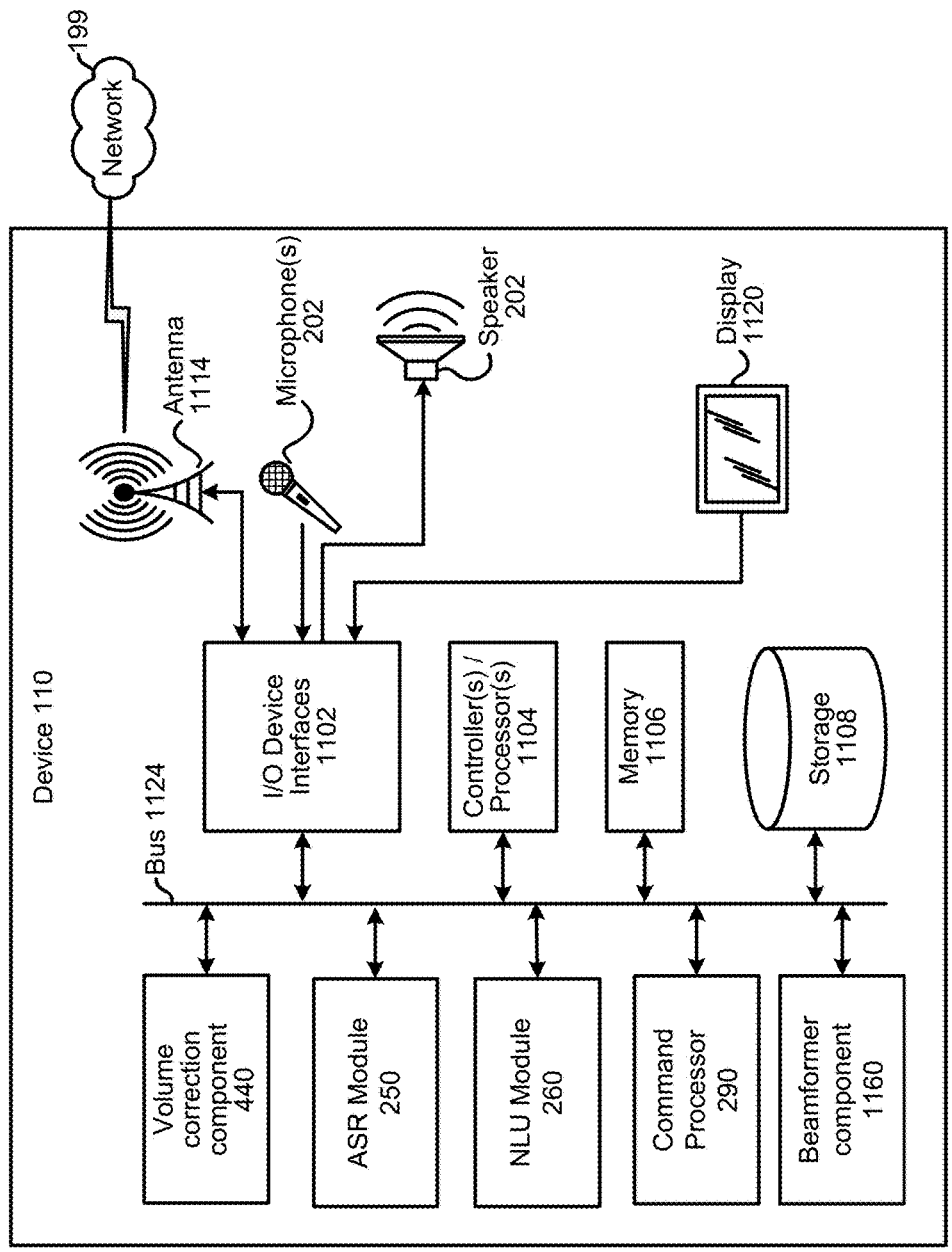
FIG. 11 is a block diagram conceptually illustrating example components of a device according to embodiments of the present disclosure.

As illustrated in FIG. 2, a device 110 may include, among other components, a microphone array 210, an output audio speaker 116, a beamformer component 1160 (as illustrated in FIG. 11), or other components. While illustrated in two dimensions, the microphone array 210 may be angled or otherwise configured in a three-dimensional configuration, with different elevations of the individual microphones or the like. The microphone array 210 may include a number of different individual microphones. As illustrated in FIG. 2, the array 210 includes eight (8) microphones, 202. The individual microphones may capture sound and pass the resulting audio signal created by the sound to a downstream component, such as analysis filterbank. Each individual piece of audio data captured by a microphone may be in a time domain. To isolate audio from a particular direction, the system may compare the audio data (or audio signals related to the audio data, such as audio signals in a sub-band domain) to determine a time difference of detection of a particular segment of audio data. If the audio data for a first microphone includes the segment of audio data earlier in time than the audio data for a second microphone, then the system may determine that the source of the audio that resulted in the segment of audio data may be located closer to the first microphone than to the second microphone (which resulted in the audio being detected by the first microphone before being detected by the second microphone).

Figure 3:
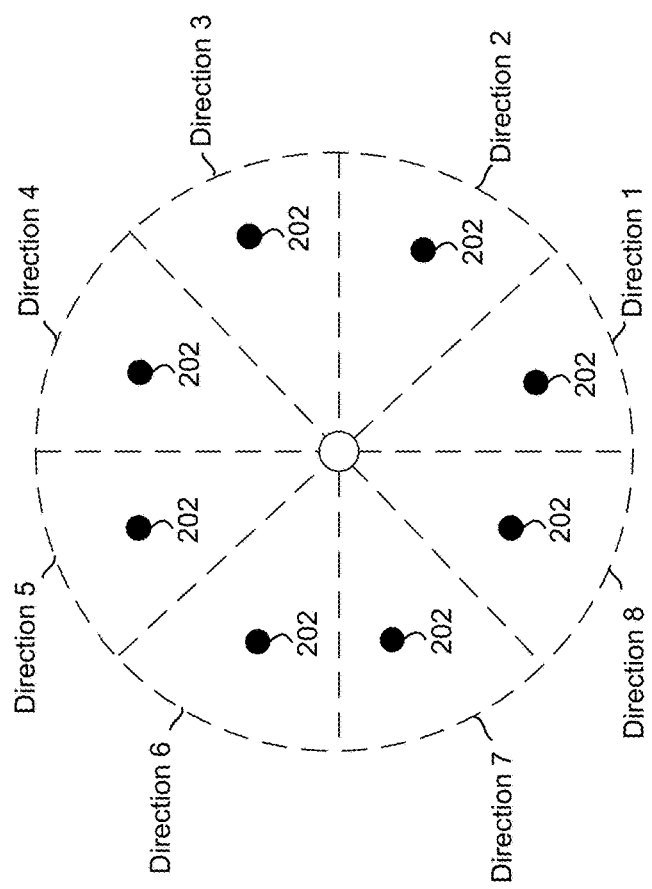
FIG. 3 illustrates directional based audio processing and beamforming according to embodiments of the present disclosure.

Using such direction isolation/beamforming techniques, a device 110 may isolate directionality of audio sources. As shown in FIG. 3, a particular direction may be associated with a particular microphone of a microphone array. For example, direction 1 is associated with one microphone, direction 2 is associated with another microphone 202, and so on. If audio is detected first by a particular microphone the device 110 may determine that the source of the audio is associated with the direction of the microphone. Further, the device 110 may use other techniques for determining a source direction of particular audio including determining what microphone detected the audio with a largest amplitude (which in turn may result in a highest strength of the audio signal portion corresponding to the audio). Other techniques (either in the time domain or in the sub-band domain) may also be used.

For example, if audio data corresponding to a user's speech is first detected and/or is most strongly detected by a microphone associated with 7, the device may determine that the user is located in a location in direction 7. The device may isolate audio coming from direction 7 using techniques known to the art. Thus, the device 110 may boost audio coming from direction 7, thus increasing the amplitude of audio data corresponding to speech from user 5 relative to other audio captured from other directions. In this manner, noise from noise sources that is coming from all the other directions will be dampened relative to the desired audio (e.g., speech from user 5) coming from direction 7.

Further, the device may engage in other filtering/beamforming operations to determine a direction associated with incoming audio where the direction may not necessarily be associated with a unique microphone. Thus a device may be capable of having a number of detectable directions that may not be exactly the same as the number of microphones.

Using beamforming and other audio isolation techniques the device 110 may isolate the desired audio (e.g., the utterance) from other audio (e.g., noise) for purposes of the operations described herein.

Figure 4:
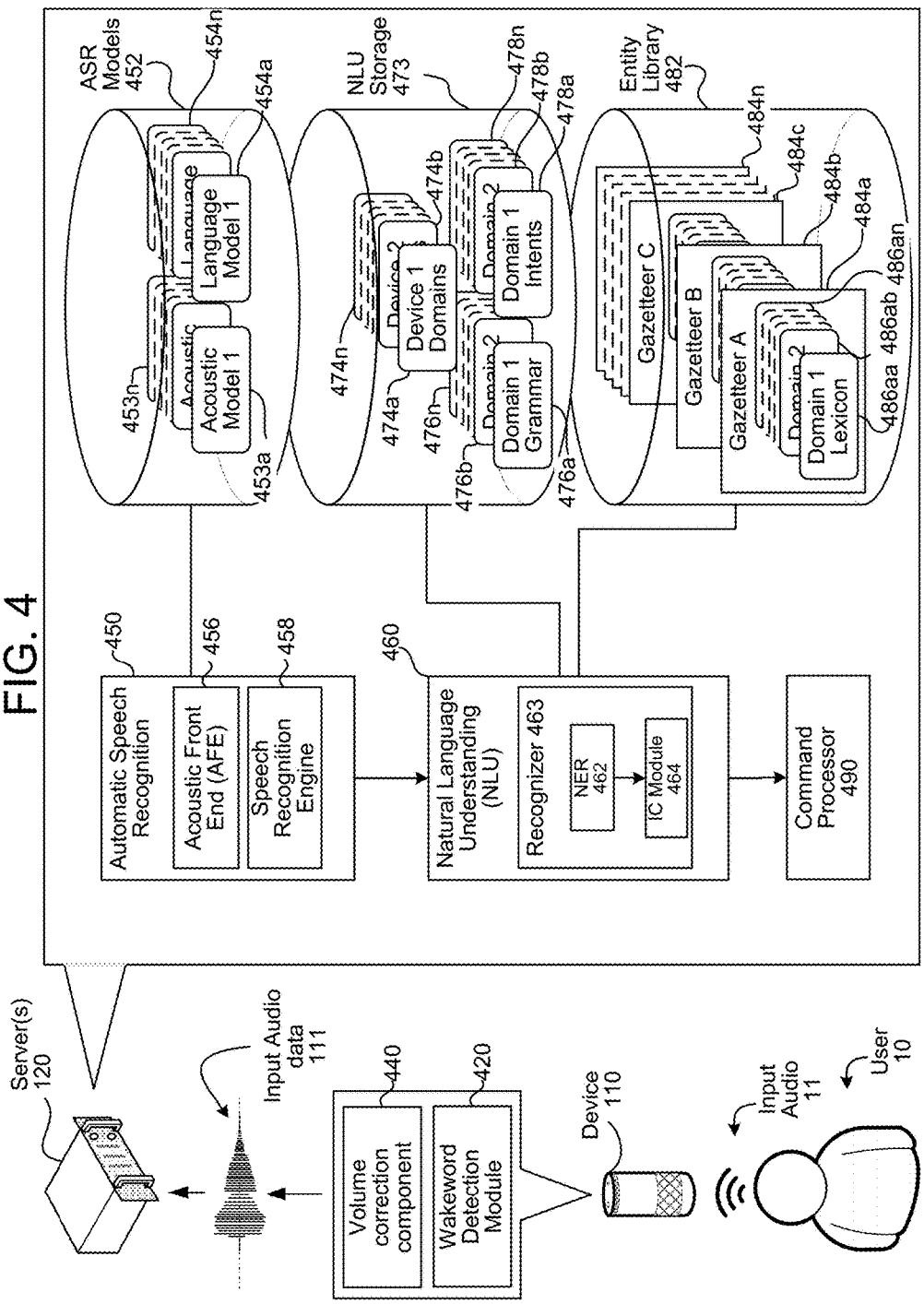
FIG. 4 is a diagram of components of a speech processing system according to embodiments of the present disclosure.

Once input audio 11 is captured, input audio data 111 corresponding to the input audio may be sent to a remote device, such as server 120, for further processing. FIG. 4 is a conceptual diagram of how a spoken utterance is processed. The various components illustrated may be located on a same or different physical devices. Communication between various components illustrated in FIG. 4 may occur directly or across a network(s) 199. An audio capture component, such as the microphone 202 of the speech-controlled device 110 (or other device), captures input audio 11 corresponding to a spoken utterance. The device 110, using a wakeword detection component 420, then processes the audio, or audio data corresponding to the audio, to determine if a keyword (such as a wakeword) is detected in the audio. Following detection of a wakeword, the speech-controlled device 110 sends audio data 111, corresponding to the input audio 11, to a server(s) 120 that includes an ASR component 450. The audio data 111 may be output from an acoustic front end (AFE) 456 located on the speech-controlled device 110 prior to transmission. Alternatively, the audio data 111 may be in a different form for processing by a remote AFE 456, such as the AFE 456 located with the ASR component 450.

The wakeword detection component 420 works in conjunction with other components of the speech-controlled device 110, for example the microphone 202 to detect keywords in audio 11. For example, the speech-controlled device 110 may convert audio 11 into audio data, and process the audio data with the wakeword detection component 420 to determine whether speech is detected, and if so, if the audio data comprising speech matches an audio signature and/or model corresponding to a particular keyword.

The speech-controlled device 110 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the speech-controlled device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio captured by the speech-controlled device 110, the speech-controlled device 110 may use the wakeword detection component 420 to perform wakeword detection to determine when a user intends to speak a query to the speech-controlled device 110. This process may also be referred to as keyword detection, with the wakeword being a specific example of a keyword. Specifically, keyword detection is typically performed without performing linguistic analysis, textual analysis, or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection component 420 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid DNN-HMM decoding framework. In another embodiment, the wakeword spotting system may be built on deep neural network (DNN)/recursive neural network (RNN) structures directly, without MINI involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the speech-controlled device 110 may "wake" and begin transmitting audio data 111 corresponding to input audio 11 to the server(s) 120 for speech processing. The audio data 111 may be sent to the server(s) 120 for routing to a recipient device or may be sent to the server(s) 120 for speech processing for interpretation of the included speech (either for purposes of enabling voice-communications and/or for purposes of executing a command in the speech). The audio data 111 may include data corresponding to the wakeword, or the portion of the audio data 111 corresponding to the wakeword may be removed by the speech-controlled device 110 prior to sending.

Upon receipt by the server(s) 120, an ASR module 450 may convert the audio data 111 into text. The ASR module 450 transcribes the audio data 111 into text data representing words of speech contained in the audio data 111. The text data may then be used by other components for various purposes, such as executing system commands, inputting data, etc. A spoken utterance in the audio data 111 is input to a processor configured to perform ASR, which then interprets the spoken utterance based on a similarity between the spoken utterance and pre-established language models 454 stored in an ASR model knowledge base (i.e., ASR model storage 452). For example, the ASR module 450 may compare the audio data 111 with models for sounds (e.g., subword units or phonemes) and sequences of sounds to identify words that match the sequence of sounds spoken in the spoken utterance of the audio data 111.

The different ways a spoken utterance may be interpreted (i.e., the different hypotheses) may each be assigned a probability or a confidence score representing a likelihood that a particular set of words matches those spoken in the spoken utterance. The confidence score may be based on a number of factors including, for example, a similarity of the sound in the spoken utterance to models for language sounds (e.g., an acoustic model 453 stored in the ASR model storage 452), and a likelihood that a particular word that matches the sound would be included in the sentence at the specific location (e.g., using a language model 454 stored in the ASR model storage 452). Thus, each potential textual interpretation of the spoken utterance (i.e., hypothesis) is associated with a confidence score. Based on the considered factors and the assigned confidence score, the ASR module 450 outputs the most likely text recognized in the audio data 111. The ASR module 450 may also output multiple hypotheses in the form of a lattice or an N-best list with each hypothesis corresponding to a confidence score or other score (e.g., such as probability scores, etc.).

The device or devices including the ASR module 450 may include an AFE 456 and a speech recognition engine 458. The AFE 456 may transform raw audio data captured by the microphone 202 into data for processing by the speech recognition engine 458. The speech recognition engine 458 compares the speech recognition data with acoustic models 453, language models 454, and other data models and information for recognizing the speech conveyed in the audio data 111.

The speech recognition engine 458 may process data output from the AFE 456 with reference to information stored in the ASR model storage 452. Alternatively, post front-end processed data (e.g., feature vectors) may be received by the device executing ASR processing from another source besides the internal AFE 456. For example, the speech-controlled device 110 may process audio data 111 into feature vectors (e.g., using an on-device AFE 456) and transmit that information to the server 120 across the network 199 for ASR processing. Feature vectors may arrive at the server 120 encoded, in which case they may be decoded prior to processing by the processor executing the speech recognition engine 458.

The speech recognition engine 458 attempts to match received feature vectors to language phonemes and words as known in the stored acoustic models 453 and language models 454. The speech recognition engine 458 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving a likelihood that the ASR module 450 will output speech results that make sense grammatically.

The speech recognition engine 458 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 458 to other processing components, which may be local to the device performing ASR and/or distributed across the network(s) 199. For example, ASR results in the form of a single textual representation of the speech, an N-best list including multiple hypotheses and respective scores, lattice, etc. may be sent to a server, such as the server 120, for natural language understanding (NLU) processing, such as conversion of the text data into commands for execution, either by the speech-controlled device 110, by the server 120, or by another device (e.g., a server running a search engine, etc.)

The device performing NLU processing 460 (e.g., server 120) may include various components, including potentially dedicated processor(s), memory, storage, etc. As shown in FIG. 4, an NLU component may include a recognizer 463 that includes a named entity recognition (NER) module 462 which is used to identify portions of query text that correspond to a named entity that may be recognizable by the system. A downstream process called named entity resolution actually links a text portion to an actual specific entity known to the system. To perform named entity resolution, the system may utilize gazetteer information (484a-484n) stored in entity library storage 482. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways. The NER module 462 (or other component) may also determine whether a word refers to an entity that is not explicitly mentioned in the utterance text, for example "him," "her," "it" or other anaphora, exophora or the like.

Generally, the NLU process takes textual input (such as processed from ASR 450 based on the utterance input audio 11) and attempts to make a semantic interpretation of the text. That is, the NLU process determines the meaning behind the text based on the individual words and then implements that meaning. NLU processing 460 interprets a text string to derive an intent or a desired action from the user as well as the pertinent pieces of information in the text that allow a device (e.g., device 110) to complete that action. For example, if a spoken utterance is processed using ASR 450 and outputs the text "call mom" the NLU process may determine that the user intended to activate a telephone in his/her device and to initiate a call with a contact matching the entity "mom" (which may involve a downstream command processor 490 linked with a telephone application).

The NLU may process several textual inputs related to the same utterance. For example, if the ASR 450 outputs N text segments (as part of an N-best list), the NLU may process all N outputs to obtain NLU results.

As will be discussed further below, the NLU process may be configured to parsed and tagged to annotate text as part of NLU processing. For example, for the text "call mom," "call" may be tagged as a command (to execute a phone call) and "mom" may be tagged as a specific entity and target of the command (and the telephone number for the entity corresponding to "mom" stored in a contact list may be included in the annotated result). Further, the NLU process may be used to provide answer data in response to queries, for example using the knowledge base 472.

To correctly perform NLU processing of speech input, an NLU process 460 may be configured to determine a "domain" of the utterance so as to determine and narrow down which services offered by the endpoint device (e.g., server 120 or device 110) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) module 462 receives a query in the form of ASR results and attempts to identify relevant grammars and lexical information that may be used to construe meaning. To do so, the NLU module 460 may begin by identifying potential domains that may relate to the received query. The NLU storage 473 includes a databases of devices (474a-474n) identifying domains associated with specific devices. For example, the device 110 may be associated with domains for music, telephony, calendaring, contact lists, and device-specific communications, but not video. In addition, the entity library may include database entries about specific services on a specific device, either indexed by Device ID, Talker ID, or Household ID, or some other indicator.

In NLU processing, a domain may represent a discrete set of activities having a common theme, such as "shopping", "music", "calendaring", etc. As such, each domain may be associated with a particular recognizer 463, language model and/or grammar database (476a-476n), a particular set of intents/actions (478a-478n), and a particular personalized lexicon (486). Each gazetteer (484a-484n) may include domain-indexed lexical information associated with a particular user and/or device. For example, the Gazetteer A (484a) includes domain-index lexical information 486aa to 486an. A user's music-domain lexical information might include album titles, artist names, and song names, for example, whereas a user's contact-list lexical information might include the names of contacts. Since every user's music collection and contact list is presumably different, this personalized information improves entity resolution.

As noted above, in traditional NLU processing, a query may be processed applying the rules, models, and information applicable to each identified domain. For example, if a query potentially implicates both communications and music, the query may, substantially in parallel, be NLU processed using the grammar models and lexical information for communications, and will be processed using the grammar models and lexical information for music. The responses based on the query produced by each set of models is scored (discussed further below), with the overall highest ranked result from all applied domains is ordinarily selected to be the correct result. This is described further in detail below in reference to FIG. 3.

An intent classification (IC) module 464 parses the query to determine an intent or intents for each identified domain, where the intent corresponds to the action to be performed that is responsive to the query. Each domain is associated with a database (478a-478n) of words linked to intents. For example, a music intent database may link words and phrases such as "quiet," "volume off," and "mute" to a "mute" intent. The IC module 464 identifies potential intents for each identified domain by comparing words in the query to the words and phrases in the intents database 478. Traditionally, the determination of an intent by the IC module is performed using a set of rules or templates that are processed against the incoming text to identify a matching intent.

In order to generate a particular interpreted response, the NER 462 applies the grammar models and lexical information associated with the respective domain to actually recognize a mention one or more entities in the text of the query. In this manner the NER 462 identifies "slots" (i.e., particular words in query text) that may be needed for later command processing. Depending on the complexity of the NER 462, it may also label each slot with a type of varying levels of specificity (such as noun, place, city, artist name, song name, or the like). Each grammar model 476 includes the names of entities (i.e., nouns) commonly found in speech about the particular domain (i.e., generic terms), whereas the lexical information 486 from the gazetteer 484 is personalized to the user(s) and/or the device. For instance, a grammar model associated with the shopping domain may include a database of words commonly used when people discuss shopping.

The intents identified by the IC module 464 are linked to domain-specific grammar frameworks (included in 476) with "slots" or "fields" to be filled. Each slot/field corresponds to a portion of the query text that the system believes corresponds to an entity. For example, if "play music" is an identified intent, a grammar (476) framework or frameworks may correspond to sentence structures such as "Play {Artist Name}," "Play {Album Name}," "Play {Song name}," "Play {Song name} by {Artist Name}," etc. However, to make resolution more flexible, these frameworks would ordinarily not be structured as sentences, but rather based on associating slots with grammatical tags.

For example, the NER module 462 may parse the query to identify words as subject, object, verb, preposition, etc., based on grammar rules and/or models, prior to recognizing named entities. The identified verb may be used by the IC module 464 to identify intent, which is then used by the NER module 462 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 462 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC module 464 will determine corresponds to the "play music" intent. At this stage, no determination has been made as to the meaning of "mother's little helper" and "the rolling stones," but based on grammar rules and models, it is determined that the text of these phrases relate to the grammatical object (i.e., entity) of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the a slot/field using gazetteer information, the NER module 462 may search the database of generic words associated with the domain (in the knowledge base 472). So for instance, if the query was "play songs by the rolling stones," after failing to determine an album name or song name called "songs" by "the rolling stones," the NER component 462 may search the domain vocabulary for the word "songs." In the alternative, generic words may be checked before the gazetteer information, or both may be tried, potentially producing two different results.

The results of NLU processing may be tagged to attribute meaning to the query. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output data from the NLU processing (which may include tagged text, commands, etc.) may then be sent to a command processor 490, which may be located on a same or separate server 120 as part of system 100. The system 100 may include more than one command processor 490, and the destination command processor 490 may be determined based on the NLU output. For example, if the NLU output includes a command to play music, the destination command processor 490 may be a music playing application, such as one located on device 110 or in a music playing appliance, configured to execute a music playing command. If the NLU output includes a search utterance (e.g., requesting the return of search results), the command processor 490 selected may include a search engine processor, such as one located on a search server, configured to execute a search command and determine search results, which may include output text data to be processed by a text-to-speech engine and output from a device as synthesized speech.

If the NLU output includes a command to obtain content from another source, the command processor 490 or other component, through an application program interface (API), may send a request for such content to an appropriate application server or other device. The application server may send the content, for example audio content, to the command processor 490 or other component. In certain instances, the output content sent from the application server may include a link that may be sent from the server 120 to the local device 110 closest to the user (e.g., first device 110a) so that the first device 110a may use the link to access the output content desired by the user. In this case the output content data may be sent from the application server through the server 120 to the first device 110*a* or directly from the application server to the first device 110*a* (or some other destination appropriate to the command). In certain instances the output content data may be audio data (such as music, a prerecorded reading of an audio book, etc.) and thus may be output through an audio speaker of the local device 110. In other instances the output content data may be text data (either generated by the application server or by a component of the server(s) 120) that needs to be converted into audio data prior to being output to a user using the local device 110.

Figure 5:
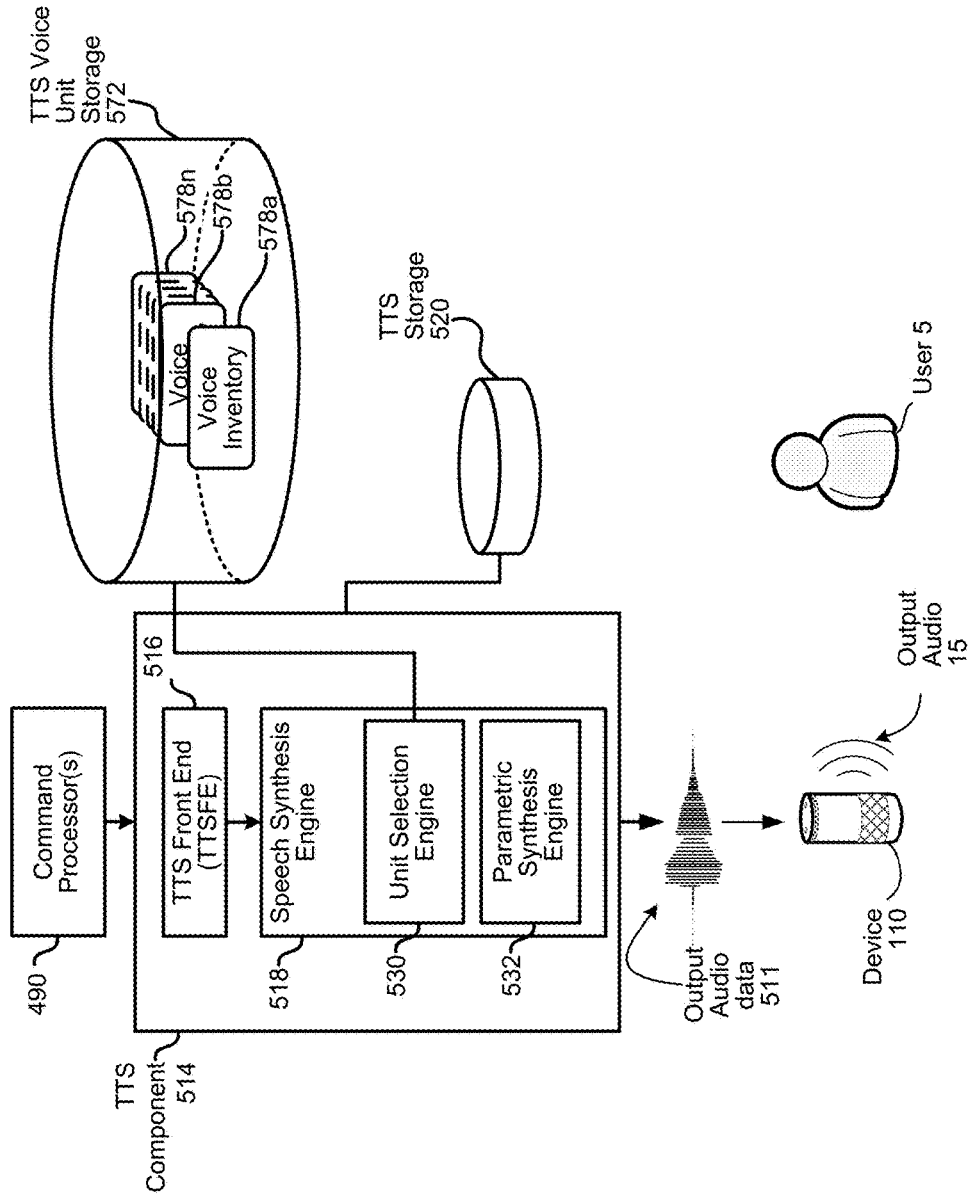
FIG. 5 is a diagram of components for text-to-speech (TTS) processing according to embodiments of the present disclosure.

A TTS component 514 may receive tagged text data from the command processor(s) 990, so the TTS component 514 may synthesize speech corresponding to the text data. Speech may be synthesized by the TTS component 514 as described below with respect to FIG. 5.

The TTS component 514 includes a TTS front end (TTSFE) 516, a speech synthesis engine 518, and a TTS storage 520. The TTSFE 516 transforms input text data (e.g., from the command processor(s) 490) into a symbolic linguistic representation for processing by the speech synthesis engine 518. The TTSFE 516 may also process tags or other data input to the TTS component 514 that indicate how specific words should be pronounced. The speech synthesis engine 518 compares the annotated phonetic units and information stored in the TTS storage 520 for converting the input text data into speech (i.e., audio data). The TTSFE 516 and the speech synthesis engine 518 may include their own controller(s)/processor(s) and memory, or they may use the controller(s)/processor(s) and memory of the server(s) 120, the speech-controlled device 110, or another device, for example. Similarly, the instructions for operating the TTSFE 516 and the speech synthesis engine 518 may be located within the TTS component 514, within the memory and/or storage of the server(s) 120, the speech-controlled device 110, or within an external device.

Text data input into the TTS component 514 may be sent to the TTSFE 516 for processing. The TTSFE 516 may include components for performing text normalization, linguistic analysis, and linguistic prosody generation. During text normalization, the TTSFE 516 processes the input text data and generates standard/normalized text data, converting such things as numbers, abbreviations (e.g., Apt., St., etc.), and symbols ($, %, etc.) into the equivalent of written out words.

During linguistic analysis, the TTSFE 516 analyzes language in the normalized text data to generate a sequence of phonetic units corresponding to the text data. This process may be referred to as phonetic transcription. Phonetic units include symbolic representations of sound units to be eventually combined and output by the system 100 as speech. Various sound units may be used for dividing text data for purposes of speech synthesis. The TTS component 514 may process speech based on phonemes (i.e., individual sounds), half-phonemes, di-phones (i.e., the last half of one phoneme coupled with the first half of an adjacent phoneme), bi-phones (i.e., two consecutive phonemes), syllables, words, phrases, sentences, or other units. Each word may be mapped to one or more phonetic units. Such mapping may be performed using a language dictionary stored by the system 100, for example in the TTS storage 520. The linguistic analysis performed by the TTSFE 516 may also identify different grammatical components such as prefixes, suffixes, phrases, punctuation, syntactic boundaries, or the like. Such grammatical components may be used by the TTS component 514 to craft a natural sounding audio waveform output. The language dictionary may also include letter-to-sound rules and other tools that may be used to pronounce previously unidentified words or letter combinations that may be encountered by the TTS component 514. Generally, the more information included in the language dictionary, the higher quality the speech output.

Based on the linguistic analysis, the TTSFE 516 may then perform linguistic prosody generation where the phonetic units are annotated with desired prosodic characteristics, also called acoustic features, which indicate how the desired phonetic units are to be pronounced in the eventual output speech. During this stage, the TTSFE 516 may consider and incorporate any prosodic annotations that accompanied the text data input to the TTS component 514. Such acoustic features may include pitch, energy, duration, and the like. Application of acoustic features may be based on prosodic models available to the TTS component 514. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, a prosodic model with more information may result in higher quality speech output than prosodic models with less information.

The output of the TTSFE 516, referred to as a symbolic linguistic representation, may include a sequence of phonetic units annotated with prosodic characteristics. This symbolic linguistic representation may be sent to the speech synthesis engine 518, also known as a synthesizer, for conversion into an audio waveform of speech for output to an audio output device and eventually to a user. The speech synthesis engine 518 may be configured to convert the input text data into high-quality natural-sounding speech in an efficient manner. Such high-quality speech may be configured to sound as much like a human talker as possible, or may be configured to be understandable to a listener without attempts to mimic a precise human voice.

The speech synthesis engine 518 may perform speech synthesis using one or more different methods. In one method of synthesis called unit selection, a unit selection engine 530 matches the symbolic linguistic representation created by the TTSFE 516 against a database of recorded speech, such as a database of a voice corpus. The unit selection engine 530 matches the symbolic linguistic representation against spoken audio units in the database. Matching units are selected and concatenated together to form a speech output. Each unit includes an audio waveform corresponding with a phonetic unit, such as a short .wav file of the specific sound, along with a description of the various acoustic features associated with the .wav file (e.g., its pitch, energy, etc.), as well as other information, such as where the phonetic unit appears in a word, sentence, or phrase, neighboring phonetic units, etc. Using all the information in the unit database, the unit selection engine 530 may match units to the input text data to create a natural sounding waveform. The unit database may include multiple examples of phonetic units to provide the system 100 with many different options for concatenating units into speech. One benefit of unit selection is that, depending on the size of the database, a natural sounding speech output may be generated. As described above, the larger the unit database of the voice corpus, the more likely the system 100 will be able to construct natural sounding speech.

In another method of synthesis, called parametric synthesis, parameters such as frequency, volume, and noise are varied by a parametric synthesis engine 532, a digital signal processor, or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Parametric synthesis may include the ability to be accurate at high processing speeds, as well as the ability to process speech without large databases associated with unit selection, but also typically produces an output speech quality that may not match that of unit selection. Unit selection and parametric techniques may be performed individually or combined together and/or combined with other synthesis techniques to produce speech audio data output.

Parametric speech synthesis may be performed as follows. The TTS component 514 may include an acoustic model, or other models, which may convert a symbolic linguistic representation into a synthetic acoustic waveform of the input text data based on audio signal manipulation. The acoustic model includes rules which may be used by the parametric synthesis engine 532 to assign specific audio waveform parameters to input phonetic units and/or prosodic annotations. The rules may be used to calculate a score representing a likelihood that a particular audio output parameter(s) (e.g., frequency, volume, etc.) corresponds to the portion of the input symbolic linguistic representation received from the TTSFE 516.

The parametric synthesis engine 532 may use a number of techniques to match speech to be synthesized with input phonetic units and/or prosodic annotations. One common technique is using HMMs. HMMs may be used to determine probabilities that audio output should match textual input. HMMs may be used to translate from parameters from the linguistic and acoustic space to the parameters to be used by a vocoder (i.e., the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text data. Each portion of text data may be represented by multiple potential states corresponding to different known pronunciations of phonemes and their parts (e.g., phoneme identity, stress, accent, position, etc.). An initial determination of a probability of a potential phoneme may be associated with one state. As new text data is processed by the speech synthesis engine 518, the state may change or stay the same, based on processing of the new text data. For example, the pronunciation of a previously processed word might change based on later processed words. A Viterbi algorithm may be used to find the most likely sequence of states based on the processed text data. The HMMs may generate speech in parametrized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, harmonic plus noise (HNM) based vocoders, code-excited linear prediction (CELP) vocoders, GlottHMM vocoders, harmonic/stochastic model (HSM) vocoders, or others.

For example, to create the customized speech output of the system 100, the system 100 may be configured with multiple voice inventories 578a-578n (stored in TTS voice unit storage 572), where each unit database is configured with a different "voice." Such voice inventories may also be linked to user accounts, discussed below. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterances may be spoken by an individual and recorded by the system 100. The TTS training utterances used to train a TTS voice corpus may be different from the training utterances used to train an ASR system. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match a desired speech quality. The customized voice inventory 578 may then be used during runtime to perform unit selection to synthesize speech.

As an alternative to customized voice corpuses or customized parametric "voices," one or more filters may be used to alter traditional TTS output to match a desired speech quality (e.g., whisper, shout, etc.). For example, the TTS component 514 may synthesize speech as normal, but the system 100, either as part of the TTS component 514 or otherwise, may apply a filter to make the synthesized speech take on the desired speech quality. In this manner a traditional TTS output may be altered to take on the desired speech quality.

During runtime the TTS component 514 may receive text data for speech synthesis along with an indicator for a desired speech quality of the output speech. The TTS component 514 may then select a voice matching the speech quality, either for unit selection or parametric synthesis, and synthesize speech using the received text data and speech quality indicator.

The output audio data 511 from the TTS component (or other output audio data) may be sent to the device 110 to be output as output audio 15, to be heard by the user 5. However, to ensure the output audio 15 has a sufficient volume at the user's location, the system 100 and device 110 may determine a gain to be applied to output audio data 11 to ensure the output audio has a sufficient volume (both absolute volume and relative to the noise heard by the user) to ensure the user properly hears the output audio data.

Figure 6:
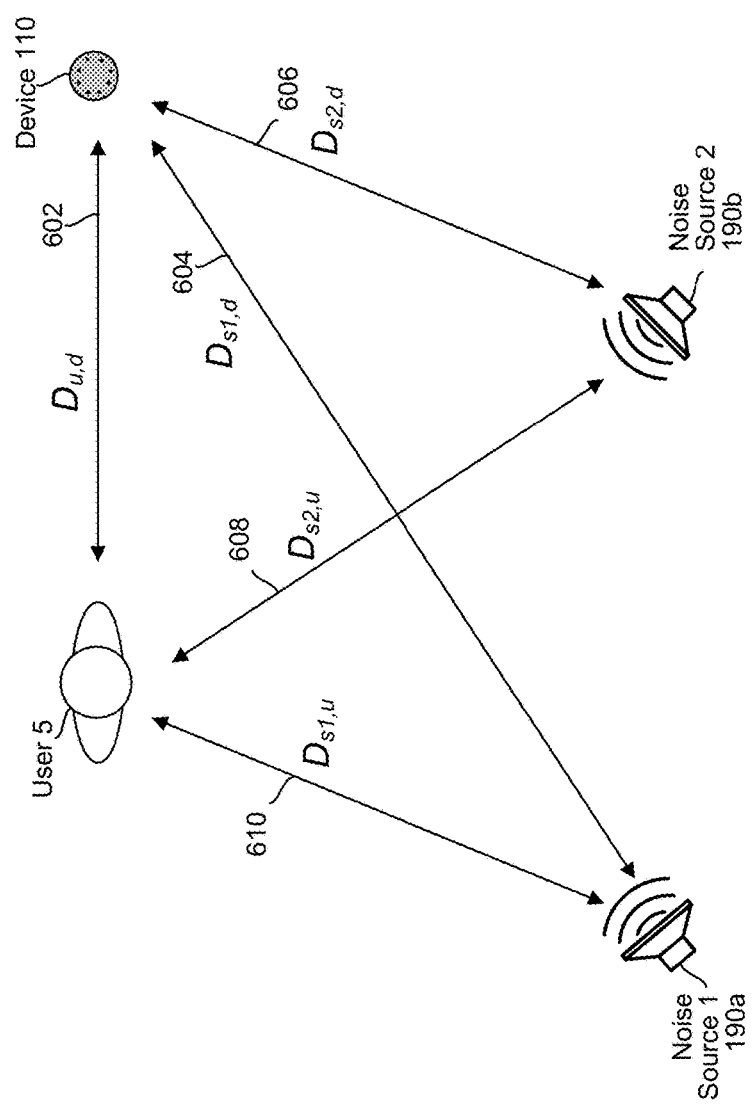
FIG. 6 illustrates determining relative positions of audio emitting and capturing elements in an environment according to embodiments of the present disclosure.

An example configuration of a listening environment is shown in FIG. 6. As shown there, a user 5, device 110, and two noise sources 190a and 190b are present in a room. The user (u) 5 is located a distance $D_{u,d}$ 602 from device (d) 110. The user 5 is located a distance $D_{s1,u}$ 610 from noise source 1 (s1) 190a. The user 5 is located a distance $D_{s2,u}$ 608 from noise source 2 (s2) 190b. The device 110 is located a distance a distance $D_{s1,d}$ 604 from noise source 1 190a. The device 110 is located a distance a distance $D_{s2,d}$ 606 from noise source 2 190b.

To determine an appropriate volume for output audio from the device 110, which may include output synthesized speech, the system may determine a noise level at a location of a user and then determine what output volume from the device 110 is appropriate to allow the user 5 to properly hear the output speech, even with the present noise. Such determinations may use a volume correction component 440 and/or other components of the device 110 and system 100. The user perceived signal quality (e.g., signal-to-noise ratio (SNR)) may be referred to as upSNR and the user perceived sound pressure level may be referred to as upSPL. Sound pressure measurements/audio detection and capture may be performed by one or more microphones of a microphone array and/or other components. The system may operate so as to arrive at a user perceived voice level of the output of the device to be at least a desiredSNR dB above the noise level and, simultaneously, to have at least a desiredSPL dB Sound Pressure Level (SPL). While the precise noise and sound pressure levels are configurable based on various system configurations, user preferences, etc., an example reasonable number for desiredSNR is 30 dB and an example reasonable number desiredSPL is 70 dB.

In order to accurately calculate the signal-to-noise ratio of the voice response at the user's ears, the system may determine (either through specific calculation, estimation, or other approach) the location and volume of noise sources in the environment as well as the distance from the device 110 to the user 5. Examples of such determinations are discussed below as well as techniques for determining the gain for output speech in various circumstances.

A gain that satisfies the signal quality at the user goal, i.e. the SNR goal, may be expressed as:

$$desiredSNR = 20\log_{10}\frac{g_{SNR}*SP(S)}{SP(N)} \quad (1)$$

Where gSNR is the gain for the output audio, SP(S) is the Sound Pressure of the device's speech output at the user's ear, and SP(N) is the Sound Pressure of the noise at the user's ear. Hence the gain for the output audio may be expressed as:

$$g_{SNR} = \frac{SP(N)}{SP(S)}10^{\frac{desiredSNR}{20}} \quad (2)$$

The inverse distance law for pressure from a point source in anechoic conditions states that $p_2 = p_1 (r_1/r_2)$, where p is the pressure and r are the radius from a point source. With the inverse relationship between distance and sound level, SP(S) may be expressed as:

$$SP(S) = \frac{SP_1(S)}{D_{u,d}} \quad (3)$$

where $SP_1(S)$ is the sound pressure of the device audio output at 1 meter (in Pa*m) and unit gain and $D_{u,d}$ is the distance from the user (u) to the device (d).

As shown in FIG. 6, the noise sources, user and device may be at specific positions and distances relative to each other. Depending on system configuration, the precise locations/distances may be known. For example, if the system is configured with image capture devices (e.g., cameras), range finders or other proximity/distance detectors, or similar such components, techniques such as computer vision, triangulation, position matching, stereo vision, light based time-of-flight, ultrasonic methods or the like may be used to calculate the precise position of various items in FIG. 6. For example, when certain equipment (e.g., device 110, noise sources 190*a*, 190*b*) are installed, their positions may be recorded and their relative distances calculated and stored, for example in association with a user profile 1004. When a user enters the room, his/her position may be calculated using cameras, proximity detectors, or other components. The output sound pressure of noise sources may also be known, for example if the system has access to the output volume information for the noise sources 190*a*/190*b*. Further, if other noise sources (e.g., children, pets, etc.) enter the room, their positions may also be calculated using such components.

If the locations and sound pressure levels of the noise sources are known, with the inverse law for Sound Pressure as a function distance, the Sound Pressure of Noise at the user's ear can be estimated as:

$$SP(N) = \sum_i \frac{SP_1(N_i)}{D_{i,u}} \quad (4)$$

where $SP_1(N_i)$ is the sound pressure at 1 meter from the noise source i, and $D_{i,u}$ is the distance between the noise source $S_i$ and the user in meters. The Sound Pressure Level of noise at each ear may therefore be expressed as:

$$SPL(N) = 20*\log_{10}SP(N) = 20*\log_{10}(\Sigma_i SP_1(N_i) \cdot D_{i,u}^{-1}) \quad (5)$$

While the system may assume the inverse relationship for sound pressure as a function of distance, this condition may hold precisely only in anechoic conditions. In real-world rooms, reflections from walls etc. may contribute more energy to the microphone. Such effects are not likely to increase the received SPL by more than a factor of 2, which translates to an error of 6 dB in the gain.

In reverberant conditions, the user may thus be assumed to be closer than she actually is and the calculated gain gSPL will be lower. By duality of the sound propagation, the perceived volume of the device's output speech will be higher due to the same reflections. Hence the error in the distance estimation will likely cancel to a large degree in the final upSPL. Similarly, noise sources will be measured at the device and be perceived by the user to be louder than their anechoic values and the resulting error in the final upSNR may be mitigated.

As noted above, a second measurement is for the device's output speech to be at a comfortable absolute level. For illustration, the desiredSPL may be 70 dB SPL, but other values may be used. With an inverse relationship of the sound pressure to distance, the relationship may be expressed as:

$$desiredSPL = 20\ \log_{10}(g_{SPL}SP_1(S)*D_{i,u}^{-1}) \quad (6)$$

where gSPL is the gain, $SP_1(S)$ is the sound pressure of the device's output audio at 1 meter and unit gain and $D_{u,d}$ is the distance 602 from the device 110 to the user's ear. The approximate gain that satisfies the SPL requirement may be expressed as:

$$g_{SPL} = \frac{D_{u,d}}{SP_1(S)}10^{\frac{desiredSPL}{20}} \quad (7)$$

To determine a gain that achieves both the gain for the desiredSNR and the gain for the desiredSPL, the system may select the larger of the two. Thus, the desired gain g may be expressed as:

$$g = \qquad (8)$$

$$\max(g_{SPL}, g_{SNR}) = \max\left[\frac{D_{u,d}}{SP_1(S)}10^{\frac{desiredSPL}{20}}, \frac{D_{u,d}SP(N)}{SP_1(S)}10^{\frac{desiredSNR}{20}}\right]$$

In certain system configurations, Equation 8 may have a number of unknowns that may be estimated or approximated. These include, for example:

The exact distance from the user 5 to the device 110 $D_{u,d}$.

The noise at the location of the user SP(N). Alternatively, the distance from each noise source to the user ($D_{S1,u}$, $D_{S2,u}$, etc.), along with the SPL of each noise source.

Figure 7:
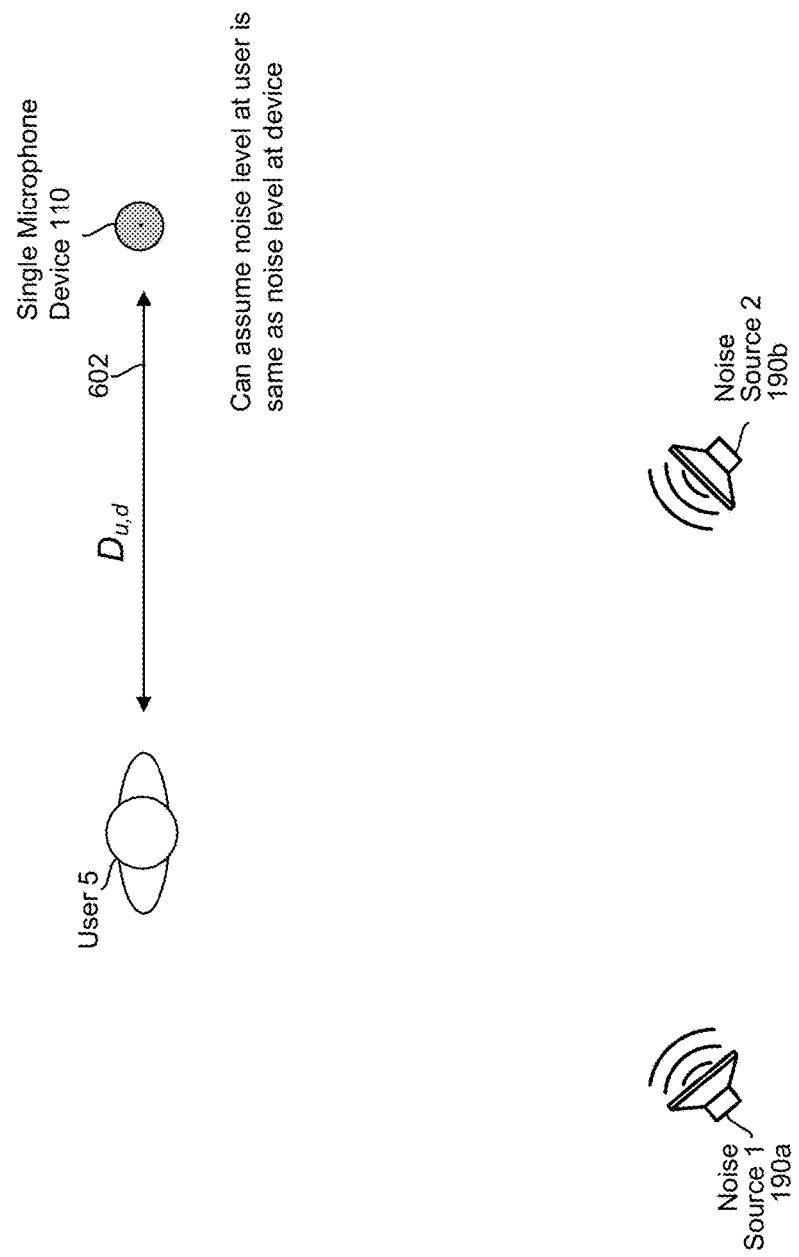
FIG. 7 illustrates estimating noise experienced by a user according to embodiments of the present disclosure.

The type of estimates that can be practically accomplished may depend on the number of devices and number of microphones that are available as well as other sensing capabilities of the device, such as the availability of range finding hardware. For example, certain devices 110 may have multiple microphones capable of performing beamforming (as explained in reference to FIGS. 2 and 3) while others may have only a single microphone. An example of a situation with a single microphone device is shown in FIG. 7. In this scenario, the possibility of estimating the upSNR and the upSPL accurately using methods such as triangulation may not be available.

It is possible to determine values for the unknowns by estimating the talker SNR talkerSNR and the absolute level of the user's voice, i.e., talkerSPL as detected at the device 110. That is, the system can determine the SNR and SPL of the user's voice as detected at the device 110, e.g., the input audio 11 as detected at the device 110. It is also be possible to estimate the Direct to Reverberant Ratio (DRR), the spectral coloring, and other data related to the talker's voice.

The talkerSP may be used to estimate the distance 602 since the lower the SP (sound pressure) of the talker, the farther the talker is from the Alexa device. The inverse relationship:

$$D_{u,d} \propto \frac{1}{talkerSP} \qquad (9)$$

can be used in Equation 7 for calculating the gain that satisfies the desiredSP.

In the absence of detailed information of where noise sources are in the environment and how far they are from the talker, the system can make the simplifying assumption that the noise level is the same at the talker location as it is at the location of the device 110, e.g.:

$$SP(N) \approx SP(Noise@device) \qquad (10)$$

This can then be inserted into Equation 2 for the gain that satisfies the desired SNR.

$$g=\max(g_{SPL}, g_{SNR}) \qquad (11)$$

$$g = \qquad (12)$$

$$\max\left[\frac{1}{SP_1(S)\cdot talkerSP}10^{\frac{deisredSPL}{20}}, \frac{SP(Noise@device)}{talkerSP\cdot SP_1(S)}10^{\frac{desiredSNR}{20}}\right]$$

The first order estimate for the talker distance in Equation 9 assumes the user consistently talks at the same level. This may not be true as the user may modulate her voice depending on the distance to the device 110 and noise in the environment. The distance estimate may be improved by taking into account the DRR as well as the spectral coloring, and other data related to the talker's voice.

A device 110 may be equipped with (or communicatively connected to) various audio, image, and/or range sensing components that may be used to determine the SPL and range of the user and noise sources. Certain components, such as a beamforming component, may calculate position data in polar coordinates. Use of Equation 8 may involve conversion of polar coordinates into a Cartesian coordinate form.

As explained in reference to FIGS. 2 and 3, there may be a number of different look directions determined by a beamformer. For example, there may be L look directions that are equally spaced from 0 to $2\pi$. In each look direction there may be a beamformer or other component that determines if the look direction contains the target talker or background noise. The device 110 may also determine the sound pressure of the noise SP@Device ($N_l$) and a range measurement $D_{l,d}$ in each potential direction 1.

Figure 8:
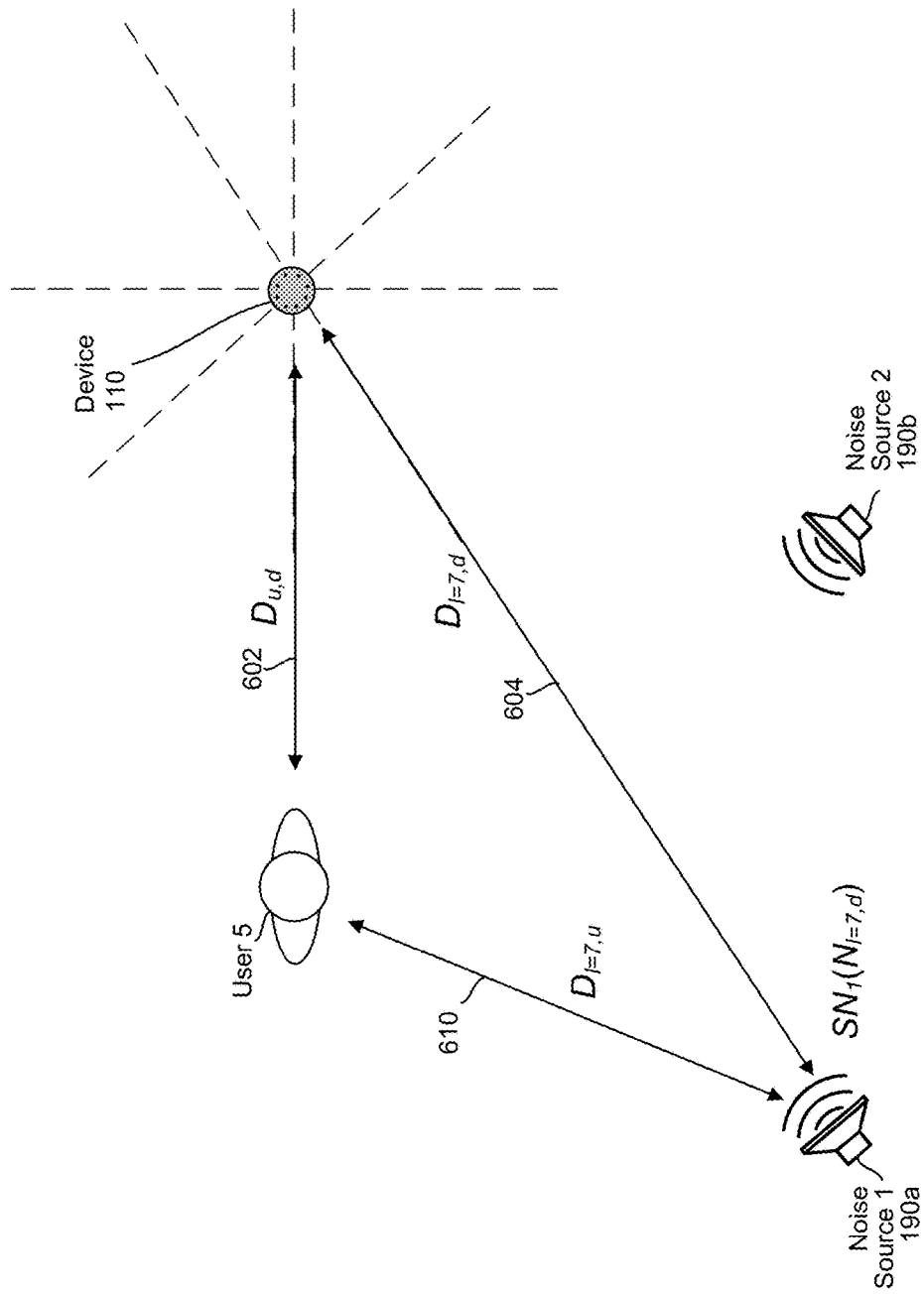
FIG. 8 illustrates determining relative positions of audio emitting and capturing elements in an environment according to embodiments of the present disclosure.
Figure 9:
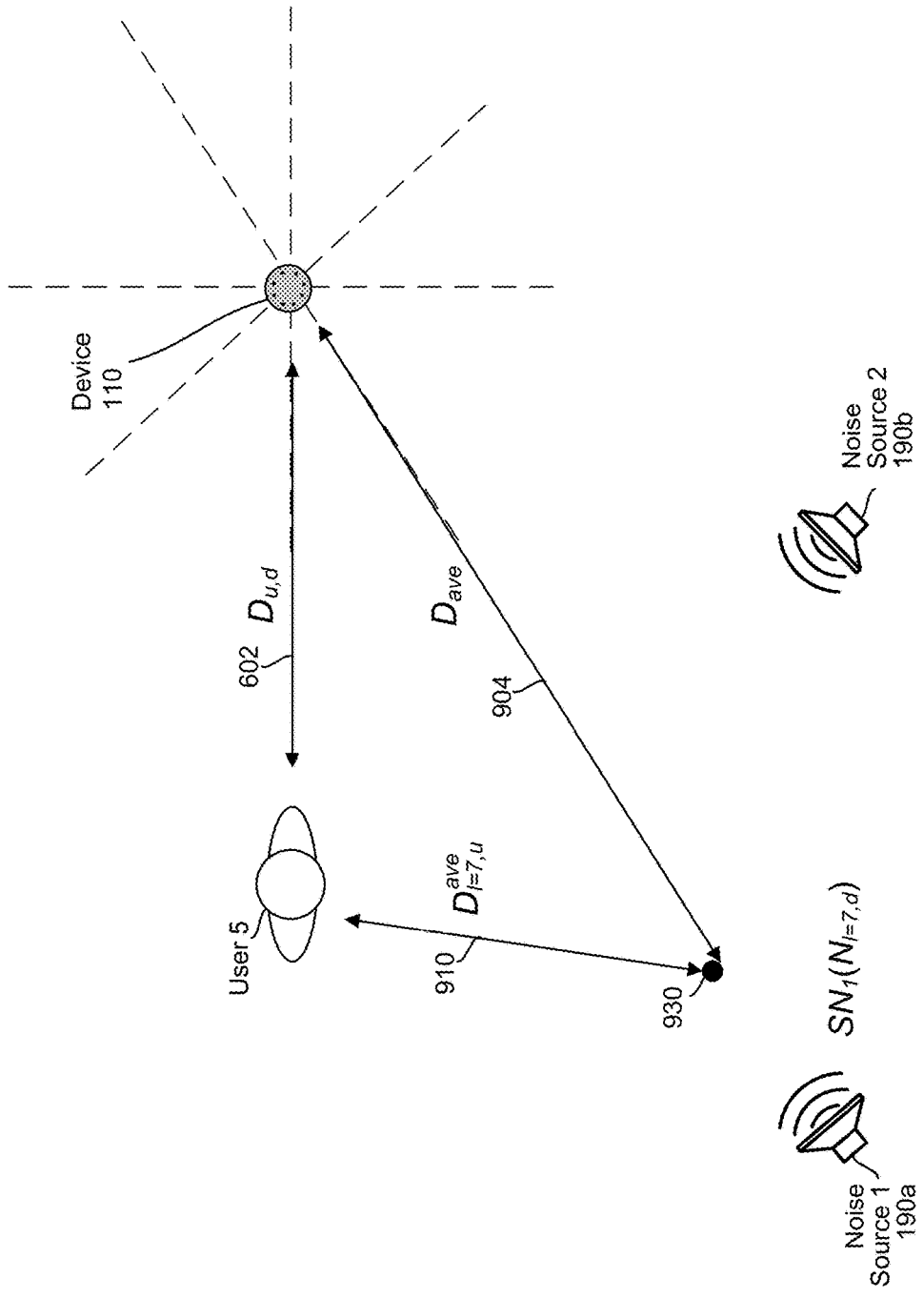
FIG. 9 illustrates estimating noise experienced by a user according to embodiments of the present disclosure.

An example of determining distance and look directions for various components relative to the device 110 is shown in FIG. 8. As shown in FIG. 8, the device may have a number of look directions (for example, eight shown in FIG. 8). As shown in FIG. 8, noise source 1 is in direction 7 relative to device 110. For illustration purposes, a two dimensional explanation is used, but the extension to three dimensional coordinates will be obvious to a reader skilled in the art. The coordinates ($x_u$, $y_u$) may represent the position of the target talker i.e., the user 5. These coordinates may be found as follows:

$$x_u=\cos(\theta_u)*D_{u,d} \qquad (13)$$

$$y_u=\sin(\theta_u)*D_{u,d} \qquad (14)$$

where $\theta_u$ is the azimuth angle of the user in the coordinate space of the device, and $D_{u,d}$ is the distance from the user 5 to the device 110.

The beam that is pointed at the user 5 (e.g., the look direction in which the user is positioned) is assumed to include a desired speech signal. Other beams are assumed to contain distracting noise. The system may assume one noise source for each beam located at ($x_l$, $y_l$). For each beam l=[0 . . . L], the location of the distracting noise sources for are estimated as:

$$x_l=\cos(\theta_l)*D_{l,d} \qquad (15)$$

$$y_l=\sin(\theta_l)*D_{l,d} \qquad (16)$$

where $\theta_l$ is the azimuth angle of beam 1 and $D_{l,d}$ is the distance from the noise source to the device 110. For example, in FIG. 8, $D_{7,d}$ 604 is the distance between device 110 and noise source 1 190a. In practice, the system may take an average of the distances from the device 110 to the noise source(s) as provided by a range finder and/or other component(s).

The sound pressure of each noise source at the noise source can be estimated as:

$$SP_1(N_1)=D_{l,u}\cdot SP_{@device}(N_l) \qquad (17)$$

where $D_{l,d}$ is the range measurement from the device 110 and $SP_{@device}(N_l)$ is the measured sound level at the device 110 for beam 1. The distance from each noise source to the target can be computed as:

$$D_{l,u}=\sqrt{(x_u-x_1)^2+(y_u-y_1)^2} \qquad (18)$$

for all look directions except the target look direction (i.e., the direction of the user). Thus, for all directions 1 except t, i.e. l E [0 . . . L]\t where t is the direction of the target.

The system can estimate the sound level of the noise as perceived by the user SP(N) by substituting the above into Equation 4:

$$SP(N) = \sum_i \frac{SP_1(N_i)}{D_{i,u}} = \sum_{l \in |0...L|\backslash t} \frac{D_{l,u} \cdot SP_{@device}(N_1)}{D_{l,u}} \quad (19)$$

The system can compute the desired gain from Equation 8 using the distance to the user $D_{u,d}$ and the noise level as perceived by the user SP(N).

$$g = \quad (20)$$

$$\max\left[\frac{D_{l,u}}{SP_1(S)}10^{\frac{desiredSPL}{20}}, \frac{\sum_{l \in |0...L|\backslash t} \frac{D_{l,u} \cdot SP_{@device}(N_1)}{D_{l,u}}}{SP_1(S)}10^{-\frac{desiredSNR}{20}}\right]$$

In certain configurations, the device 110 may have a beamformer, but may not have a range finder or have access to other components that can precisely locate the user and/or noise sources. In such a system configuration, the system may determine an average estimated distance for the noise sources for purposes of determining the gain. When a beamformer is available, the device can measure the SP and other acoustic metrics in each look direction. As in the one microphone case, the system can estimate the distance to the target talking user as:

$$D_{u,d} \propto \frac{1}{talkerSP} \quad (21)$$

In the absence of a direct measurement of the distance to each noise source and to the talker, the system may make assumptions about specific locations. In this case, the system can assume all noise sources are at an average distance $D_{ave}$. Thus the system may use the average distance $D_{ave}$ for $D_{l,d}$. When computing the distance from the noise source to the user $D_{l,u}^{ave}$, the system may assume the noise source (e.g., noise source 1 190a) is at the distance $D_{ave}$ from the device 110. $D_{ave}$ may be a default value that is stored on the device, with a user profile, or in some other manner. $D_{ave}$ may be determined by averaging room data available to the system (which may in turn be based on a geographical location of the device 110), by using specific room data related to the user/location of the device (for example as indicated in a user profile), by performing an audio calibration and measuring the room impulse response or other characteristics of the room, or using other techniques. With this assumption, the system can estimate the sound level of the noise as perceived by the user SP(N) by substituting the above into Equation 4:

$$SP(N) = \sum_i \frac{SP_1(N_i)}{D_{i,u}} = \sum_{l \in |0...L|\backslash t} \frac{D_{ave} \cdot SP_{@device}(N_1)}{D_{l,u}^{ave}} \quad (22)$$

If the noise source is close to the device 110, the above estimate may overestimate the noise level of a particular source. For example, if the $D_{ave}$ is determined to be 3 meters, but an interfering Bluetooth speaker is actually sitting 0.3 meters from the device 110, the estimate may be 10 times higher, or 20 dB too high for that particular noise source. This can be countered by putting a limit on the estimate for the noise source, for example:

$$SP_{1,clamp}(N_1) = \max[D_{ave} \cdot SP_{@device}(N_1), \max SP] \quad (23)$$

where maxSP is a maximum sound pressure setting. The maximum sound pressure may be a setting of the device 110, or may be configurable, for example in conjunction with a user profile 1004. The desired gain in this configuration may thus be expressed as:

$$g = \max\left[\frac{D_{l,u}}{SP_1(S)}10^{\frac{desiredSPL}{20}}, \frac{D_{l,u}\sum_{l \in |0...L|\backslash t} \frac{SP_{1,clamp}(N_1)}{D_{l,u}^{ave}}}{SP_1(S)}10^{-\frac{desiredSNR}{20}}\right] \quad (24)$$

When multiple devices 110 are present in a room the devices may exchange information about audio sources and the position/distance of the noise sources and the talker can be localized with some degree of accuracy using various techniques. For example, if three or more devices are present, this can be accomplished by triangulation. Additionally, the level of the noise sources can be estimated with reasonable accuracy. In such a case, Equation 8 can be used directly.

As the device 110 adjusts its output volume in view of environmental noise, it may also receive spoken utterances or other commands from a user (for example, through a companion application running on another device such as a phone or tablet) to adjust its volume or otherwise adjust its output speech. For example, a user may speak commands such as "volume up," "volume level 5," repeat that," "speak up," or the like. Thus, the gain determined using the techniques above may not necessarily be adequate for all users in all scenarios. This may be due to a variety of reasons such as differences between the environment and assumptions made by the system, systematic errors in estimates, personal preferences and/or speaking styles of a user, hearing impairment of the user, etc. To account for these, and other potential adjustments, the system may incorporate a learning component into the volume correction component 440. For example, the volume correction component 440 may include a trained model or other component that can be trained to correlate detected input conditions (as represented by audio data and/or data from various other components) to different gain levels to be applied under those conditions. The trained model may be stored by the device 110 or by another component of the system (e.g., with a user profile 1004). When user commands are received that alter the device's output volume the model may update using the perceived audio conditions to learn the circumstances behind the adjustment. The model may then be used to adjust some of the values and assumptions made using the processes described above.

Further, to assist the keep track of the desired gain, the device (or other system component) may track what conditions correspond to what level of gain. For example, the device 110 may maintain a table of gain values that correspond to the estimates for the user perceived SNR (upSNR) and user perceived SPL (upSPL). Initially, the table may be populated with gains computed using Equation 8 or similar approach. When the user makes a volume adjustment, the table may be updated. An example of a portion of a table with default gain values is shown below in Table 1, with different combinations of user perceived noise level upNSPL (by row) and distance from the user to the device $D_{u,d}$ (by column):

TABLE 1

| upNSPL ↓, $D_{u,d}$ → | 1 m | 2 m | 3 m |
|---|---|---|---|
| 60 dB SPL | 80 | 90 | 100 |
| 70 dB SPL | 85 | 95 | 105 |
| 80 dB SPL | 90 | 100 | 110 |

To save storage, the gain table may not store every possible combination of values. Intermediate gain values can be computed by bi-linear interpolation or other techniques.

When the user requests a volume adjustment that applies to the device's output audio level, the table may be updated. One example update rule may be:

$$\text{gain}(upNSPL, D_{u,d}) \leftarrow \begin{cases} \text{gain}(upNSPL, D_{u,d}) + 5 \text{ dB} & \text{User raised volume} \\ \text{gain}(upNSPL, D_{u,d}) - 5 \text{ dB} & \text{User lowered volume} \end{cases} \quad (26)$$

If adjustments to default values are made, they may apply to neighboring levels as well. For example, if one cell of table is updated, its neighboring cells may be updated as well. Neighboring cells may also be updated using a smoothing kernel. For example, one component of a smoothing may be to adjust the cell above by a lesser amount, e.g. 2 dB:

$$\text{gain}(upNSPL - 5, D_{u,d}) \leftarrow \begin{cases} \text{gain}(upNSPL, D_{u,d} - 5) + 2 \text{ dB} & \text{User raised volume} \\ \text{gain}(upNSPL, D_{u,d} - 5) - 2 \text{ dB} & \text{User lowered volume} \end{cases}$$

and similarly to other adjacent cells below and to the sides.

In an example, the device 110 may determine that upSPL=70 dB and $D_{u,d}$=2 m and the user asked the system to raise the voice volume. Applying the above approach, the table in Table 1 would be updated and the result would be as shown in Table 2 below, with updated table entries shown in bold:

TABLE 2

| upNSPL ↓, Du,d → | 1 m | 2 m | 3 m |
|---|---|---|---|
| 60 dB SPL | 80 | 92 | 100 |
| 70 dB SPL | 87 | 100 | 107 |
| 80 dB SPL | 90 | 102 | 110 |

The table can be initialized using Equation 8. An alternate approach for initializing the gain table is to do so from real world aggregate user data. In this case, data may be collected from many different devices regarding gains relative to acoustic conditions. A method similar to that described is then used above to learn the best average gains and use the learned values as the initial values in the gain table.

The table can be initialized using Equation 8. An alternate approach for initializing the gain table is to do so from real world aggregate user data. In this case, data may be collected from many different devices regarding gains relative to acoustic conditions. A method similar to that described is then used above to learn the best average gains and use the learned values as the initial values in the gain table.

In the above discussion a single gain value was found that influenced the overall gain independent of frequency. In another configuration, in a sub-band architecture, where frequency ranges are processed and available separately, an extension to the above can be made so that separate gains are used for different sub-bands. Thus one gain may be applied for one frequency range of output audio while a separate gain may be applied for another frequency range of output audio. The processes described above may be performed for multiple different respective sub-bands, resulting in multiple different respective gains. In another example, when the voice output from the device 110 is loud, the spectral tilt of the voice may be changed to emphasize higher frequencies and de-emphasize lower frequencies.

While the above operations detail the calculation of volume for output audio from the device 110, the same operations may apply to determining an output volume from a different device, for example an audio output device (such as a wall speaker) that is separate from an audio input device (such as a wall microphone).

Figure 10:
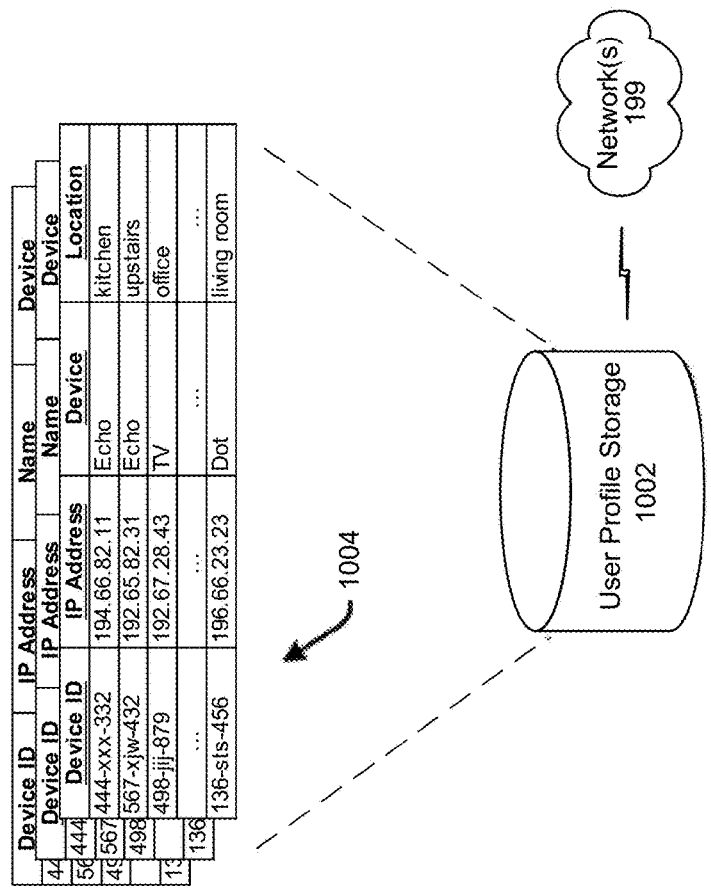
FIG. 10 illustrates data stored and associated with user profiles according to embodiments of the present disclosure.

FIG. 10 illustrates a user profile storage 1002 that includes data regarding user accounts 1004 as described herein. The user profile storage 1002 may be located proximate to the server 120, or may otherwise be in communication with various components, for example over the network 199. The user profile storage 1002 may include a variety of information related to individual users, accounts, etc. that interact with the system 100. For illustration, as shown in FIG. 10, the user profile storage 1002 may include data regarding the devices associated with particular individual user accounts 1004. In an example, the user profile storage 1002 is a cloud-based storage. Each user profile 1004 may include data such as device identifier (ID) data, talker identifier (ID) data, voice profiles for users, internet protocol (IP) address data, name of device data, and location of device data for different devices. In addition each user profile 1004 may include data regarding the locations of individual devices (including how close devices may be to each other in a home, if the device location is associated with a user bedroom, etc.), address data, or other such information. Each user profile 1004 may also include user settings, preferences, permissions, room configuration information, information regarding available connected devices, etc. For example, a particular user profile may indicate what specific users and/or devices are permitted to access the presence information for privacy protection purposes.

Various machine learning techniques may be used to train and operate models to perform various steps described above, such as volume adjustments, ASR functions, NLU functions, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 12:
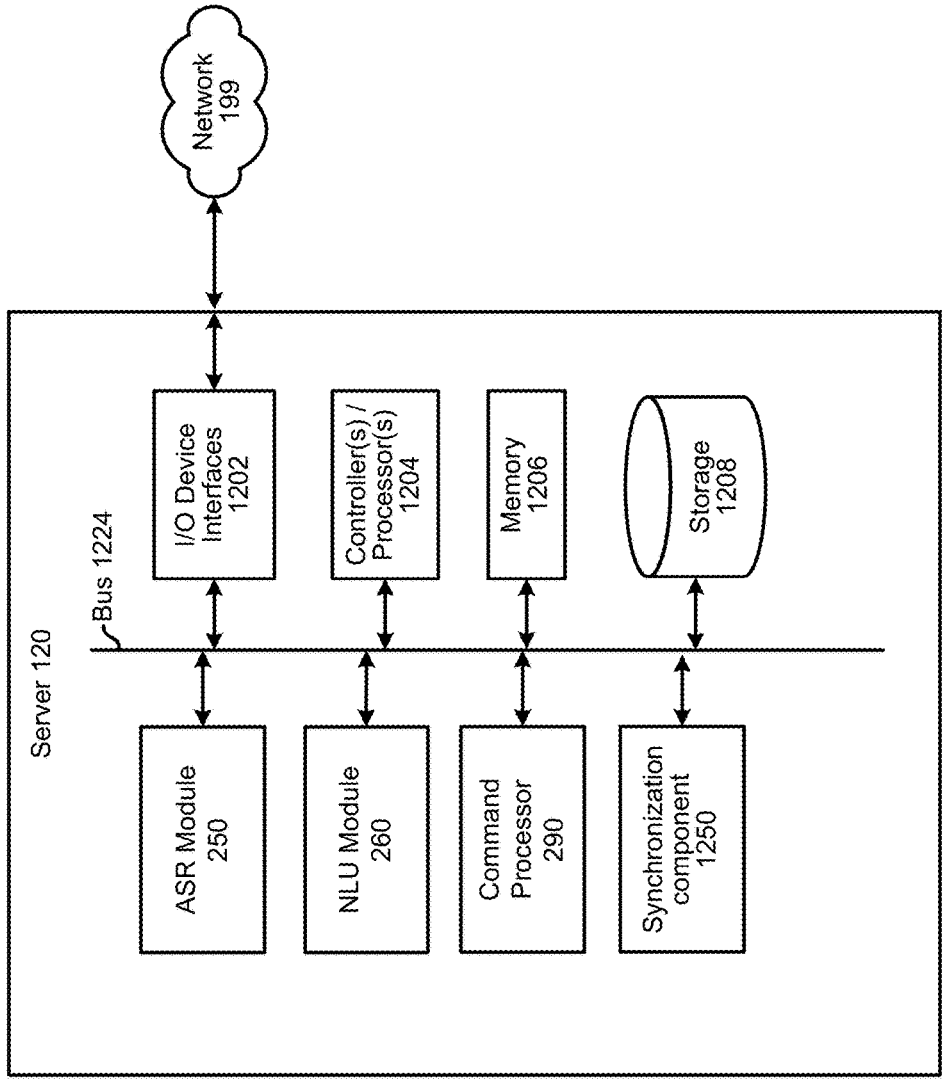
FIG. 12 is a block diagram conceptually illustrating example components of a server according to embodiments of the present disclosure.

FIG. 11 is a block diagram conceptually illustrating a user device 110 (e.g., the speech-capture device 110 described herein) that may be used with the described system. FIG. 12 is a block diagram conceptually illustrating example components of a remote device, such as the server 120 that may assist with ASR processing, NLU processing, or command processing. Multiple servers 120 may be included in the system 100, such as one server 120 for performing ASR, one server 120 for performing NLU, etc. In operation, each of these devices (or groups of devices) may include computer-readable and computer-executable instructions that reside on the respective device (110/120), as will be discussed further below.

Each of these devices (110/120) may include one or more controllers/processors (1104/1204), that may each include a central processing unit (CPU) for processing data and computer-readable instructions, and a memory (1106/1206) for storing data and instructions of the respective device. The memories (1106/1206) may individually include volatile random access memory (RAM), non-volatile read only memory (ROM), non-volatile magnetoresistive (MRAM) and/or other types of memory. Each device (110/120) may also include a data storage component (1108/1208), for storing data and controller/processor-executable instructions. Each data storage component may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (1102/1202).

Computer instructions for operating each device (110/120) and its various components may be executed by the respective device's controller(s)/processor(s) (1104/1204), using the memory (1106/1206) as temporary "working" storage at runtime. A device's computer instructions may be stored in a non-transitory manner in non-volatile memory (1106/1206), storage (1108/1208), or an external device(s). Alternatively, some or all of the executable instructions may be embedded in hardware or firmware on the respective device in addition to or instead of software.

Each device (110/120) includes input/output device interfaces (1102/1202). A variety of components may be connected through the input/output device interfaces (1102/1202), as will be discussed further below. Additionally, each device (110/120) may include an address/data bus (1124/1224) for conveying data among components of the respective device. Each component within a device (110/120) may also be directly connected to other components in addition to (or instead of) being connected to other components across the bus (1124/1224).

Referring to FIG. 11, the device 110 may include input/output device interfaces 1102 that connect to a variety of components such as an audio output component such as a speaker 220, a visual output component such as a display 1120, a wired headset or a wireless headset (not illustrated), or other component capable of outputting audio. The display 1120 may output image and/or video data as described herein. The device 110 may also include an audio capture component. The audio capture component may be, for example, a microphone 202 or array of microphones, a wired headset or a wireless headset (not illustrated), etc. The microphone 202 may be configured to capture audio. If an array of microphones is included, approximate distance to a sound's point of origin may be determined by acoustic localization based on time and amplitude differences between sounds captured by different microphones of the array.

Via antenna(s) 1114, the input/output device interfaces 1102 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the speech processing system may be distributed across a networked environment.

The device 110 and/or the server 120 may include an ASR module 450. The ASR module 450 in the device 110 may be of limited or extended capabilities. The ASR module 450 may include the language models 454 stored in ASR model storage component 452. If limited speech recognition is included, the ASR module 450 may be configured to identify a limited number of words, whereas extended speech recognition may be configured to recognize a much larger range of words.

The device 110 and/or the server 120 may include a limited or extended NLU module 460. The NLU module 460 in the device 110 may be of limited or extended capabilities. The NLU module 460 may comprise the name entity recognition module 462, the intent classification module 464, and/or other components. The NLU module 460 may also include a stored knowledge base and/or entity library, or those storages may be separately located.

The device 110 and/or the server 120 may also include the command processor 490 configured to execute commands/functions associated with a spoken utterance as described herein.

The device 110 and/or server 120 may include or be communicatively connected to components such as a proximity sensing component (e.g., range finder, proximity sensor, or the like). The device 110 and/or the server 120 may include or be communicatively connected to an image processing component such as one or more camera(s), computer-vision components, or the like. The device 110 may also include a beamformer component 1160 to perform beamforming operations. The device 110 may also include a volume correction component 440 to determine gain determination operations as described above with the various equations.

As noted above, multiple devices may be employed in a single speech processing system. In such a multi-device system, each of the devices may include different components for performing different aspects of the speech processing. The multiple devices may include overlapping components. The components of the device 110 and the server 120, as illustrated in FIGS. 11 and 12, are exemplary, and may be located as a stand-alone device or may be included, in whole or in part, as a component of a larger device or system.

Figure 13:
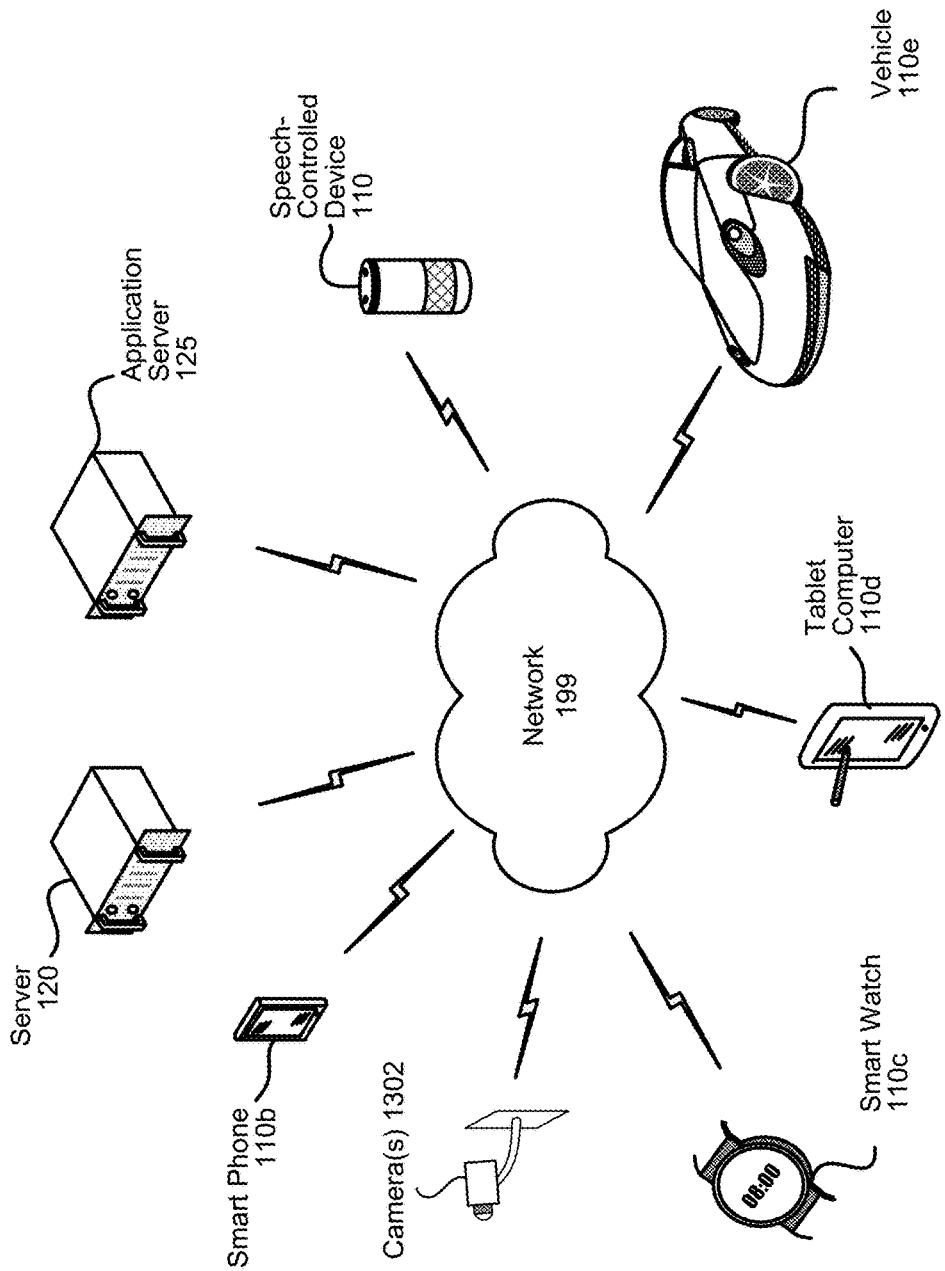
FIG. 13 illustrates an example of a computer network for use with the system.

As illustrated in FIG. 13, multiple devices (120, 110, 110b-110e) may contain components of the system 100 and the devices may be connected over a network 199. The network 199 may include a local or private network or may include a wide network such as the Internet. Devices may be connected to the network 199 through either wired or wireless connections. For example, the speech-controlled device 110, a tablet computer 110d, a smart phone 110b, a smart watch 110c, and/or a vehicle 110e may be connected to the network 199 through a wireless service provider, over a WiFi or cellular network connection, or the like. Other devices are included as network-connected support devices, such as the server 120, application developer devices (e.g., the application server 125), or others. The support devices may connect to the network 199 through a wired connection or wireless connection. Networked devices may capture audio using one-or-more built-in or connected microphones 202 or audio capture devices, with processing performed by ASR, NLU, or other components of the same device or another device connected via the network 199, such as the ASR module 450, the NLU module 460, etc. of one or more servers 120. The system may also include various other sensors such as camera(s) 1302, image processing components, range sensors or proximity sensing components, or other components as described above.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of one or more of the modules and engines may be implemented as in firmware or hardware, such as the AFE 456, which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computing device comprising:
   a microphone array comprising a plurality of microphones;
   a beamforming component;
   an audio output component;
   a proximity detector;
   at least one processor; and
   memory including instructions operable to be executed by the at least one processor to configure the computing device to:
     detect input audio corresponding to a utterance, the utterance being received from a first direction relative to the microphone array;
     send input audio data corresponding to the utterance to a remote device;
     determine a first sound pressure of the input audio at a first location of the microphone array;
     determine, using the proximity detector, a first distance between a talker of the utterance and the first location;
     detect noise audio, the noise audio being received from one or more directions relative to the microphone array, the one or more directions not including the first direction;
     determine a second sound pressure of the noise audio at the first location;
     determine, using the proximity detector, a second distance between a noise source of the noise audio and the first location;

calculate a third sound pressure of the noise audio, the third sound pressure corresponding to a second location of the talker;

calculate a desired sound pressure for audio to be outputted by the computing device, the desired sound pressure corresponding to the second location;

calculate a first gain corresponding to the audio to be outputted audio using at least the desired sound pressure, the first distance data, and the third sound pressure;

receive, from the remote device, audio data corresponding to synthesized speech responsive to the utterance; and determine output audio corresponding to the audio data, the output audio having an output volume based on the first gain.

2. The computing device of claim 1, wherein to calculate the first gain the instructions further configure the computing device to:

determine a ratio of desired audio to noise audio at the second location;

divide the ratio by 20 to calculate a first value;

calculate a second value by taking 10 to the power of the first value;

divide the third sound pressure by the desired sound pressure to calculate a third value; and multiply the third value by the second value to calculate the first gain.

3. The computing device of claim 2, wherein the memory further comprises instructions that further configure the computing device to:

identify, using a stored setting of the device, a threshold level of desired audio output audio sound pressure at the second location;

divide the threshold level by 20 to calculate a first value;

calculate a second value by taking 10 to the power of the first value;

determine a third value corresponding to an output sound pressure at approximately one meter away from the first location;

divide the first distance data by the third value to calculate a fourth value; and multiply the fourth value by the second value to calculate a second gain.

4. The computing device of claim 3, wherein the memory further comprises instructions that further configure the computing device to:

receive further input audio data corresponding to a second utterance;

determine that the second utterance corresponds to a command to increase an output volume; and update the stored setting of the device to store a second threshold level, the second threshold level being greater than the threshold level.

5. A device comprising:

at least one processor; and memory including instructions operable to be executed by the at least one processor to configure the device to:

detect first audio corresponding to an audio input;

calculate a first sound pressure of first audio at a location of a talker;

determine a distance between the location of the talker and the device;

calculate a second sound pressure of noise audio at the location of the talker;

calculate a desired sound pressure of output audio, the desired sound pressure corresponding to the location of the talker;

calculate a gain using the desired sound pressure and the distance; and determine an output volume for the output audio based on at least the distance, the second sound pressure and the gain.

6. The device of claim 5, wherein the memory further comprises instructions that further configure the device to:

receive data corresponding to the location of the talker from one or more of an image processing component or a proximity sensing component;

calculate a third sound pressure of the input audio at a second location of at least one microphone used to detect the input audio; and determine the first sound pressure using the third sound pressure and the data corresponding to the location of the talker.

7. The device of claim 5, wherein the memory further comprises instructions that further configure the device to:

determine a second distance between a third location of a noise source and a second location of the device;

calculate a third sound pressure of the noise audio at the second location;

calculate a fourth sound pressure of the noise audio at the third location;

determine a third distance between the third location and the location of the talker; and calculate the second sound pressure using the fourth sound pressure and the second distance.

8. The device of claim 7, wherein the memory further comprises instructions that further configure the device to:

select a pre-stored estimated distance as the second distance.

9. The device of claim 5, wherein the memory further comprises instructions that further configure the device to:

determine a ratio of desired audio to noise audio at the location of the talker;

divide the ratio by 20 to calculate a first value;

calculate a second value by taking 10 to the power of the first value;

divide the second sound pressure by the desired sound pressure to calculate a third value;

multiply the third value by the second value to calculate a second gain; and determine the output volume using the second gain.

10. The device of claim 9, wherein the memory further comprises instructions that further configure the device to:

identify, using a stored setting of the device, a level of desired audio output audio sound pressure at the location of the user;

divide the level by 20 to calculate a first value;

calculate a second value by taking 10 to the power of the first value;

determine a third value corresponding to an output sound pressure at approximately one meter away from an output audio device;

divide the distance by the third value to calculate a fourth value; and multiply the fourth value by the second value to calculate a third gain.

11. The device of claim 10, wherein the memory further comprises instructions that further configure the device to:

determine a command to increase an output volume; and update the stored setting of the device to store a second level, the second level being greater than the level.

12. A computer-implemented method comprising:
- detecting first audio corresponding to an audio input;
- calculating a first sound pressure of first audio at a location of a talker;
- determining a distance between the location of the talker and a device;
- calculating a second sound pressure of noise audio at the location of the talker;
- calculating a desired sound pressure of output audio, the desired sound pressure corresponding to the location of the talker;
- calculating a gain using the desired sound pressure and the distance; and
- determining an output volume for output audio based at least on the distance, the second sound pressure and the gain.

13. The computer-implemented method of claim 12, further comprising:
- receiving data corresponding to the location of the talker from one or more of an image processing component or a proximity sensing component;
- calculating a third sound pressure of the input audio at a second location of at least one microphone used to detect the input audio; and
- determining the first sound pressure using the third sound pressure and the data corresponding to the location of the talker.

14. The computer-implemented method of claim 12, further comprising:
- determining a second distance between a third location of a noise source and a second location of the device;
- calculating a third sound pressure of the noise audio at to the second location;
- calculating a fourth sound pressure of the noise audio at the third location;
- determining a third distance between the third location and the location of the talker; and
- calculating the second sound pressure using the fourth sound pressure and the second distance.

15. The computer-implemented method of claim 14, further comprising selecting a pre-stored estimated distance as the second distance.

16. The computer-implemented method of claim 12, further comprising:
- determining a ratio of desired audio to noise audio at the location of the talker;
- dividing the ratio by 20 to calculate a first value;
- calculating a second value by taking 10 to the power of the first value;
- dividing the second sound pressure by the desired sound pressure to calculate a third value;
- multiplying the third value by the second value to calculate a second gain; and
- determining the output volume using the second gain.

17. The computer-implemented method of claim 16, further comprising:
- identifying, using a stored setting of the device, a level of desired audio output audio sound pressure at the location of the user;
- dividing the level by 20 to calculate a first value;
- calculating a second value by taking 10 to the power of the first value;
- determining a third value corresponding to an output sound pressure at approximately one meter away from an output audio device;
- dividing the distance by the third value to calculate a fourth value; and
- multiplying the fourth value by the second value to calculate a third gain.

18. The computer-implemented method of claim 17, further comprising:
- determining a command to increase an output volume; and
- updating the stored setting of the device to store a second level, the second level being greater than the level.

* * * * *